United States Patent
Dai et al.

(10) Patent No.: US 9,282,549 B2
(45) Date of Patent: Mar. 8, 2016

(54) METHOD AND USER EQUIPMENT FOR TRANSMITTING FEEDBACK INFORMATION

(75) Inventors: Bo Dai, Shenzhen (CN); Shuqiang Xia, Shenzhen (CN); Chunli Liang, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 466 days.

(21) Appl. No.: 13/824,085

(22) PCT Filed: Jun. 30, 2011

(86) PCT No.: PCT/CN2011/076678
§ 371 (c)(1),
(2), (4) Date: Mar. 15, 2013

(87) PCT Pub. No.: WO2012/041098
PCT Pub. Date: Apr. 5, 2012

(65) Prior Publication Data
US 2013/0182692 A1 Jul. 18, 2013

(30) Foreign Application Priority Data
Sep. 30, 2010 (CN) .......................... 2010 1 0503424

(51) Int. Cl.
*H04W 72/04* (2009.01)
*H04L 1/00* (2006.01)
(Continued)

(52) U.S. Cl.
CPC ......... *H04W 72/0413* (2013.01); *H04L 1/0026* (2013.01); *H04L 1/0028* (2013.01); *H04L 1/1671* (2013.01); *H04L 1/1861* (2013.01)

(58) Field of Classification Search
None
See application file for complete search history.

(56) References Cited

U.S. PATENT DOCUMENTS

2010/0098012 A1 4/2010 Bala et al.
2012/0014320 A1* 1/2012 Nam ..................... H04L 1/1671
370/328

FOREIGN PATENT DOCUMENTS

CN 101771502 A 7/2010
CN 101779403 A 7/2010
(Continued)

OTHER PUBLICATIONS

"Details for A/N transmission based on DFT-s-OFDM"; ZTE, 6.2.2.1, Discussion and Decision; 3GPP TSG RAN WG1 Meeting #62 Madrid, Spain, Aug. 23-27, 2010; R1-104671; pp. 2-9/E.
(Continued)

*Primary Examiner* — Huy D Vu
*Assistant Examiner* — Teisha D Hall
(74) *Attorney, Agent, or Firm* — Ling Wu; Stephen Yang; Ling and Yang Intellectual Property

(57) ABSTRACT

A method for transmitting feedback information and a user equipment are disclosed in the present document, wherein, one method includes: a User Equipment (UE) performing time domain extension on feedback information within one subframe; and mapping respectively data which go through the time domain extension and demodulation reference signals corresponding to the data which go through the time domain extension to multiple uplink Single Carrier-Frequency Division Multiple Access (SC-FDMA) symbols within the subframe, and transmitting the data which go through the time domain extension and the demodulation reference signals corresponding to the data which go through the time domain extension in the same frequency domain position in a way of time division multiplexing; wherein, each uplink SC-FDMA symbol occupies n successive physical resource blocks in the frequency domain, and n is a positive integer.

18 Claims, 8 Drawing Sheets

(51) Int. Cl.
*H04L 1/16* (2006.01)
*H04L 1/18* (2006.01)

(56) References Cited

FOREIGN PATENT DOCUMENTS

| CN | 101783718 A | 7/2010 |
| CN | 101958774 A | 1/2011 |
| WO | 2010048142 A1 | 4/2010 |

OTHER PUBLICATIONS

International Search Report for PCT/CN2011/076678 dated Sep. 18, 2011.

\* cited by examiner

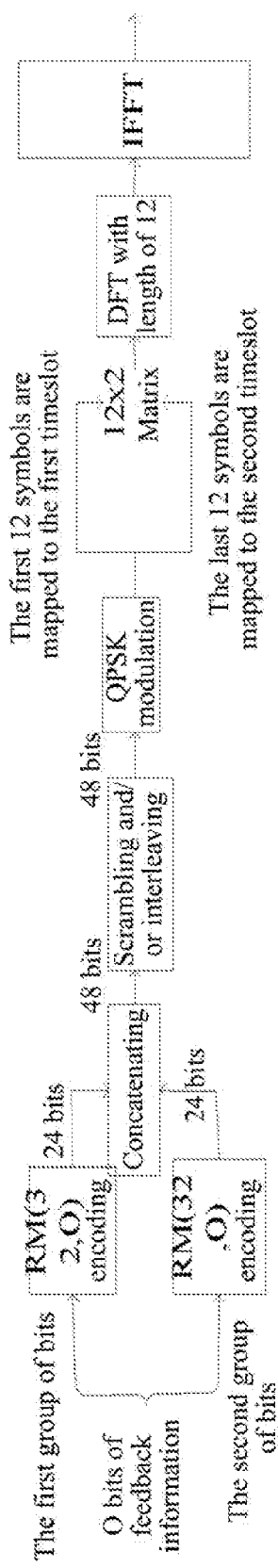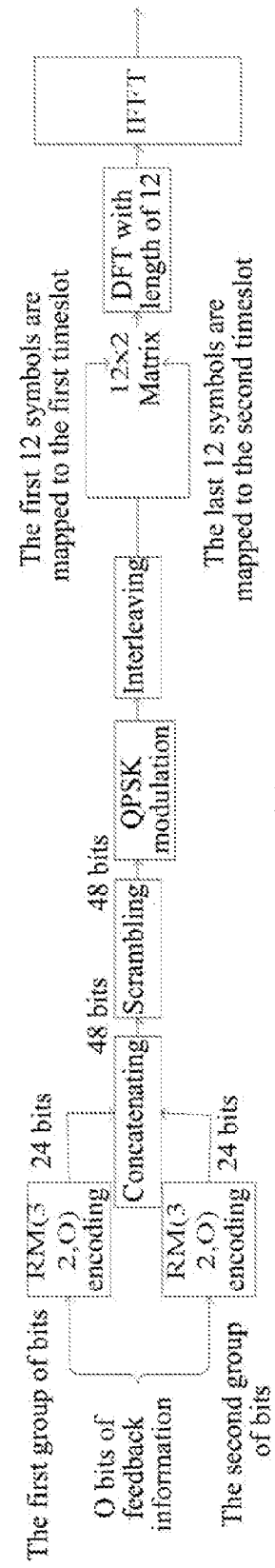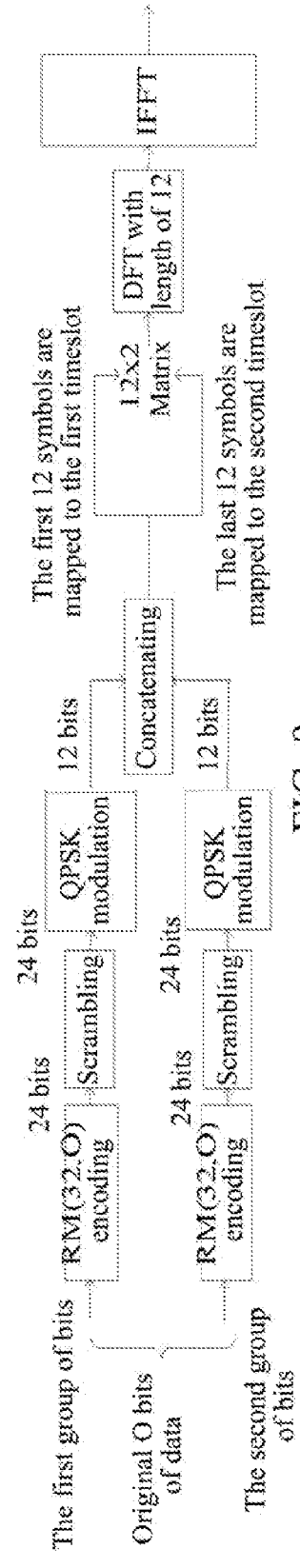
FIG. 8a
FIG. 8b
FIG. 8c

METHOD AND USER EQUIPMENT FOR TRANSMITTING FEEDBACK INFORMATION

TECHNICAL FIELD

The present invention relates to the field of mobile radio communication, and particularly, to a method for transmitting feedback information and a user equipment.

BACKGROUND OF THE RELATED ART

Radio frames in a Long Term Evolution (LTE) system include a frame structure of Frequency Division Duplex (FDD) mode and a frame structure of Time Division Duplex (TDD) mode. As shown in FIG. 1, in the frame structure of the FDD mode, one 10 ms radio frame consists of 20 slots numbered as 0~19 and with length of 0.5 ms, slots 2i and 2i+1 constitute a subframe i with length of 1 ms (wherein, $0 \leq i \leq 9$). As shown in FIG. 2, in the frame structure of the TDD mode, one 10 ms radio frame consists of 2 half frames with length of 5 ms, 5 subframes with length of 1 ms are included in one half frame, and the subframe i is defined as a combination of two slots 2i and 2i+1 with length of 0.5 ms (wherein, $0 \leq i \leq 9$).

In the above two frame structures, when a Normal Cyclic Prefix (Normal CP) is used, 7 symbols with length of 66.7 us are contained in one slot, wherein the CP length of the first symbol is 5.21 us, and the CP length of each of the rest 6 symbols is 4.69 us; and when an Extended Cyclic Prefix (Extended CP) is used, 6 symbols are contained in one slot, and the CP length of each symbol is 16.67 us.

Uplink-downlink configurations supported by each subframe are as shown in Table 1. Wherein, D represents a subframe exclusively used for the downlink transmission, U represents a subframe exclusively used for the uplink transmission, and S represents a special subframe used for 3 domains: Downlink Pilot Time Slot (DwPTS), Guard Period (GP) and Uplink Pilot Time Slot (UpPTS).

TABLE 1

A schematic table of uplink-downlink configurations supported by each subframe

| Uplink-downlink configurations | Downlink-uplink switchover point period | Subframe number # | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

From the above table, it can be seen that the LTE TDD supports a 5 ms uplink-downlink handover period and a 10 ms uplink-downlink handover period. If a downlink-uplink switchover point period is 5 ms, the special subframe will exist in two half frames; if the downlink-uplink switchover point period is 10 ms, the special subframe only exists in the first half frame; the subframe#0 and subframe #5 and the DwPTS are always used for the downlink transmission; and the UpPTS and subframes following the special subframe closely are exclusively used for the uplink transmission.

The LTE uses a Single Carrier-Frequency Division Multiple Access (SC-FDMA) way in uplink, and an uplink time domain symbol is an uplink SC-FDMA symbol. Formats of a Physical Uplink Control Channel (PUCCH) are divided into 6 formats: Format 1, Format 1a, Format 1b, Format 2, Format 2a and Format 2b, and 15 bits of original information can be transmitted at most. Each PUCCH occupies resources of 2 physical resource blocks in one subframe and occupies resources of 1 physical resource block in one slot.

In order to satisfy the requirements of International Telecommunication Union-Advanced (ITU-Advanced), a Long Term Evolution Advanced (LTE-A) system, as an advanced standard of the LTE, is required to support the wider system bandwidth (up to 100 MHz) and is required to be backward compatible with the existing standard of the LTE. Based on the existing LTE system, bandwidths of the LTE system can be combined to obtain the wider bandwidth, and this technology is called as Carrier Aggregation (CA) technology. The technology can improve spectrum utilization efficiency of an International Mobile Telecommunications-Advanced (IMT-Advanced) system and relieve shortage of spectrum resources, thereby optimizing utilization of the spectrum resources. LTE system bandwidths of the carrier aggregation can be regarded as a Component Carriers (CC), and each component carrier also can be called as one Cell, and it can be formed from the aggregation of n component carriers (Cells). Resources of an R10 User Equipment (UE) are composed of n cells (component carriers) of the frequency domain, wherein, one cell is called as a Primary cell, and each of the rest cells is called as a Secondary cell.

A format based on Discrete Fourier Transform Spread-Orthogonal Frequency Division Multiplexing (DFT-S-OFDM) is introduced in the LTE-A system, which is used to support that a UE with more than 4 bits performs feedback of ACKnowledgement/Non-ACKnowledgement (ACK/NACK) messages, and this new format based on the DFT-S-OFDM is called as a control channel format 3, and the PUCCH Format 3 uses an encoding way of Reed Muller (32, O) in the related art (i.e. an RM (32, O) encoding way), and 11 bits of information can be transmitted at most.

In a TDD system, one uplink subframe will correspond to multiple downlink subframes, and each downlink subframe has n cells, as shown in FIG. 3. According to different transmission modes, each cell can have one transmission block for transmission and also can have two transmission blocks for transmission. Due to the carrier aggregation, when one subframe corresponds to multiple cells in the frequency domain, the UE is required to perform feedback of downlink channel information of the multiple cells. Currently, since the bit capacity of the PUCCH feedback information is limited, it fails to perform simultaneous feedback of information of multiple cells of a corresponding downlink channel in one PUCCH, thus it needs to be allocated to different subframes for performing transmission, and this will cause longer feedback delay of the information, which goes against downlink dynamic scheduling of the base station and influences the system performance.

SUMMARY OF THE INVENTION

The main object of the present invention is to provide a method for transmitting feedback information and a User Equipment (UE), to overcome the defect that the UE cannot perform simultaneous feedback of information of multiple cells of a corresponding downlink channel in one Physical Uplink Control Channel (PUCCH) in the related art.

In order to solve the above problem, the present document provides a method for transmitting feedback information, which comprises:

a User Equipment (UE) performing time domain extension on feedback information within one subframe; and mapping respectively data which go through the time domain extension and demodulation reference signals corresponding to the data which go through the time domain extension to multiple uplink Single Carrier-Frequency Division Multiple Access (SC-FDMA) symbols within the subframe, and transmitting the data which go through the time domain extension and the demodulation reference signals corresponding to the data which go through the time domain extension in a same frequency domain position in a way of time division multiplexing;

wherein, each uplink SC-FDMA symbol occupies n successive physical resource blocks in the frequency domain, and n is a positive integer.

In the above method, the step of performing time domain extension on feedback information comprises: performing encoding, scrambling and/or interleaving, and modulation on the feedback information, and then performing Discrete Fourier Transform (DFT) on data after going through the encoding, scrambling and/or interleaving and modulation, wherein, a processing order of the scrambling, interleaving and modulation is arbitrary.

In the above method, the step of performing encoding on the feedback information comprises: firstly dividing O bits of feedback information into Y groups, and then encoding each group of data respectively, an encoding way is RM (32, O) encoding or convolutional encoding; wherein, if the length of the ith group of encoded data is $Z_i$, $$\sum_{i=0}^{Y-1} Z_i = n \times L \times Q \times 2$$

or $$\sum_{i=0}^{Y-1} Z_i = n \times L \times Q,$$

wherein, Q represents the number of bits corresponding to one modulation symbol, L is the number of subcarriers contained in one physical resource block, and Y is a positive integer.

In the above method, the step of performing time domain extension on feedback information within one subframe comprises:

the UE concatenating all groups of encoded feedback information in order, or interleaving all groups of encoded feedback information, or interleaving all groups of encoded feedback information by block; or after respectively performing scrambling and modulation operation on each group of encoded feedback information, the UE concatenating all groups of symbols obtained after the modulation, wherein, a concatenating way is orderly concatenating or interleaving.

In the above method, the step of dividing O bits of feedback information into Y groups comprises: starting from a first bit in a sequence composed of the feedback information, performing division into Y groups in order, except the last group, there are $$\left\lfloor \frac{O}{Y} \right\rfloor$$

bits contained in each group, and the number of bits contained in the last group is equal to or greater than $$\left\lfloor \frac{O}{Y} \right\rfloor$$

bits; or performing modulo operation between the location in which each bit is located in the sequence composed of the feedback information and the Y, and classifying bits with identical modulo values under a group; or, when the feedback information is channel state information, classifying the bits representing feedback information corresponding to each cell under a group correspondingly; or, starting from the first bit in the sequence composed of the feedback information, performing division into Y groups in order, wherein the number of bits contained in each group of O mod Y groups is $$\left\lfloor \frac{O}{Y} \right\rfloor + 1,$$

and the number of bits contained in each group of remaining Y−(O mod Y) groups is $$\left\lfloor \frac{O}{Y} \right\rfloor.$$

In the above method, an interleaving way is to perform interleaving on data to be interleaved according to a fixed sequence, or to perform interleaving on the data to be interleaved according to a row-wise write and column-wise read way, or to perform interleaving according to a block interleaving method.

In the above method, the step of performing DFT on data after going through the encoding, scrambling and/or interleaving and modulation comprises: performing DFT processing on all data in the time domain, or performing DFT processing on data borne by each physical resource block in the time domain respectively.

In the above method, a sequence of the demodulation reference signals is composed of a sequence with the length of n×L; or a sequence of the demodulation reference signals is composed of n sequences with lengths of L, wherein L is the number of subcarriers contained in one physical resource block.

In the above method, the sequence is a Zadoff-Chu (ZC) sequence or a Computer Generation ZC sequence.

In the above method, when a total bandwidth is N and physical resource block indexes are numbered from 0, if a physical resource block index occupied by an uplink SC-FDMA symbol within a first timeslot in the subframe is m, a physical resource block index occupied by an uplink SC-FDMA symbol within a second timeslot in the subframe is N−1−m or m.

In the above method, when h uplink SC-FDMA symbols are contained in one timeslot, the step of mapping data which go through the time domain extension and demodulation reference signals corresponding to the data which go through the time domain extension to multiple uplink SC-FDMA symbols within the subframe comprises: mapping the data which go through the time domain extension respectively to f uplink SC-FDMA symbols within each timeslot in the subframe, and mapping the demodulation reference signals corresponding to the data which go through the time domain extension respectively to another g uplink SC-FDMA symbols within each timeslot in the subframe; or, mapping a part of the data which go through the time domain extension to f uplink SC-FDMA symbols within the first timeslot in the subframe, mapping another part of the data to f uplink SC-FDMA symbols within the second timeslot in the subframe, and mapping demodulation reference signals corresponding to all parts of mapped data correspondingly to another g uplink SC-FDMA symbols within corresponding timeslots in the subframe; wherein, h=f+g, and f is a time domain extended sequence length.

In the above method, when the normal cyclic prefix is used in the timeslots, h=7, f=5 and g=2; and when the extended cyclic prefix is used in the timeslots, h=6, f=5 and g=1.

In the above method, the feedback information comprises any one or any combination of ACKnowledgement or Non-ACKnowledgement (ACK/NACK) information, channel state information, rank indication information and scheduling request information.

In order to solve the above problem, the present document further provides a method for transmitting feedback information, and the method comprises:

after a user equipment dividing feedback information into n groups, transmitting each group of data correspondingly through one Physical Uplink Control Channel (PUCCH) of which a format is PUCCH Format 2 or PUCCH Format 3; wherein, n is 2, and PUCCHs bearing the data occupy a same physical resource block or adjacent physical resource blocks in the frequency domain.

In the above method, the step of a user equipment dividing feedback information into n groups comprises: starting from a first bit in a sequence composed of O bits of the feedback information, performing division into n groups in order, except the last group, there are $$\left\lfloor \frac{O}{n} \right\rfloor$$

bits contained in each group, and the number of bits contained in the last group is equal to or greater than $$\left\lfloor \frac{O}{n} \right\rfloor$$

bits; or performing modulo operation between the location in which each bit is located in the sequence composed of the feedback information and the n, and classifying bits with identical modulo values under a group; or, when the feedback information is channel state information, classifying the bits representing feedback information corresponding to each cell under a group correspondingly; or, starting from the first bit in the sequence composed of the feedback information, performing division into Y groups in order, wherein the number of bits contained in each group of O mod n groups is $$\left\lfloor \frac{O}{n} \right\rfloor + 1,$$

and the number of bits contained in each group of remaining n−(O mod n) groups is $$\left\lfloor \frac{O}{n} \right\rfloor.$$

In the above method, the feedback information comprises any one or any combination of ACKnowledgement or Non-ACKnowledgement (ACK/NACK) information, channel state information, rank indication information and scheduling request information.

In order to solve the above problem, the present document further provides a user equipment, and the user equipment comprises: a time domain extension module and a data transmission module;

the time domain extension module is configured to: perform time domain extension on feedback information within one subframe;

the data transmission module is configured to: map extended data obtained by the time domain extension module and demodulation reference signals corresponding to the extended data respectively to multiple uplink Single Carrier-Frequency Division Multiple Access (SC-FDMA) symbols within the subframe, and transmit the extended data and the demodulation reference signals corresponding to the extended data in a same frequency domain position in a way of time division multiplexing; wherein, each uplink SC-FDMA symbol occupies n successive physical resource blocks in the frequency domain, and n is a positive integer.

In the above user equipment, the time domain extension module is configured to perform time domain extension on the feedback information within one subframe in the following way: performing encoding, scrambling and/or interleaving and modulation on the feedback information, and performing Discrete Fourier Transform (DFT) on data which go through the above processing, wherein, a processing order of the scrambling, interleaving and modulation is arbitrary.

In order to solve the above problem, the present document further provides a user equipment, and the user equipment comprises: a group division module and a transmission module;

the group division module is configured to: divide feedback information into n groups;

the transmission module is configured to: transmit each group of data correspondingly through one Physical Uplink Control Channel (PUCCH) of which a format is PUCCH Format 2 or PUCCH Format 3; wherein, n is 2, and PUCCHs bearing the data occupy a same physical resource block or adjacent physical resource blocks in the frequency domain.

In the above user equipment, the group division module is configured to divide the feedback information into n groups in the following way:

starting from a first bit in a sequence composed of O bits of the feedback information, performing division into n groups in order, except the last group, there are $$\left\lfloor \frac{O}{n} \right\rfloor$$

bits contained in each group, and the number of bits contained in the last group is equal to or greater than $$\left\lfloor \frac{O}{n} \right\rfloor$$

bits;

or performing modulo operation between a location in which each bit is located in a sequence composed of the feedback information and the n, and classifying bits with identical modulo values under a group;

or, when feedback information is channel state information, classifying bits representing feedback information corresponding to each cell under a group correspondingly;

or, starting from the first bit in the sequence composed of the feedback information, performing division into n groups in order, wherein the number of bits contained in each group of O mod n groups is $$\left\lfloor \frac{O}{n} \right\rfloor + 1,$$

and the number of bits contained in each group of remaining n−(O mod n) groups is $$\left\lfloor \frac{O}{n} \right\rfloor.$$

In the present invention, the number of bits of feedback information of UE is increased, which enhances the uplink feedback capacity, guarantees the maximum throughput of the system, and decreases the feedback delay of downlink channel information.

BRIEF DESCRIPTION OF DRAWINGS

FIG. 8a, FIG. 8b and FIG. 8c are respectively schematic diagrams of encoding, modulation and mapping processes of the PUCCH Format X when n=1.

PREFERRED EMBODIMENTS OF THE PRESENT INVENTION

In order to make the object, technical scheme and advantages of the present invention more clear, the examples of the present invention will be described in detail in combination with the accompanying drawings below. It should be noted that the examples in the present invention and the characteristics in the examples can be optionally combined with each other in the condition of no conflict.

Figure 9:
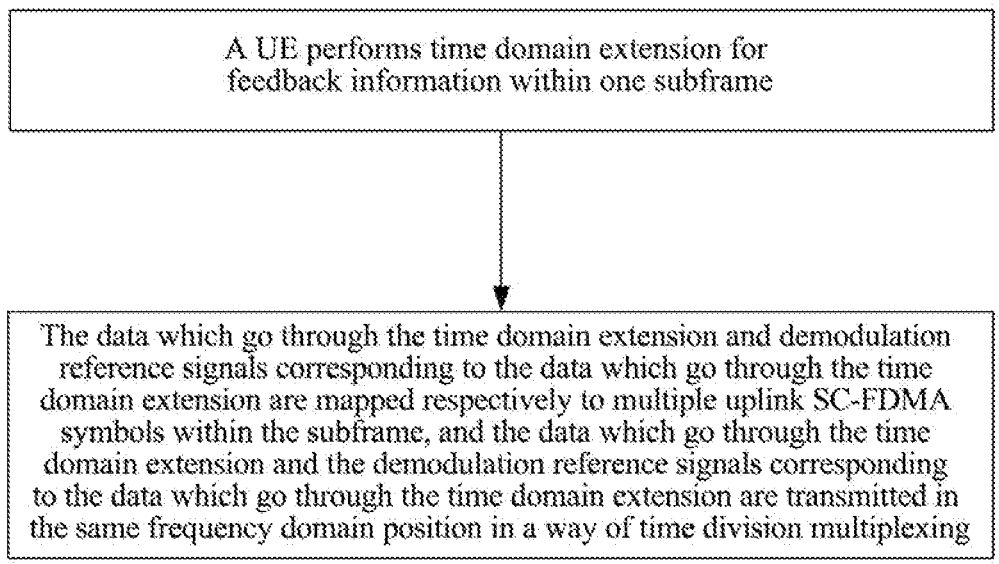
FIG. 9 is a flow diagram of method for transmitting feedback information according to the example of the present invention.

A method for transmitting feedback information according to the example of the present invention is as shown in FIG. 9, and the method includes:

a UE performing time domain extension on feedback information within one subframe; wherein, the feedback information can be any one or any combination of ACKnowledgement or Non-ACKnowledgement (ACK/NACK) information, channel state information, rank indication information and scheduling request information; and the number of bits contained in the feedback information can be determined according to uplink-downlink timeslot configurations, cells configured for the UE and corresponding transmission modes;

mapping data which go through the time domain extension and demodulation reference signals corresponding to the data which go through the time domain extension respectively to multiple uplink SC-FDMA symbols within the subframe, and transmitting the data which go through the time domain extension and the demodulation reference signals corresponding to the data which go through the time domain extension in a same frequency domain position in a way of time division multiplexing; wherein, each uplink SC-FDMA symbol occupies n successive physical resource blocks in the frequency domain, and n is a positive integer; a sequence of the demodulation reference signals can be composed of a Computer Generation-Zadoff-Chu (CG-ZC) sequence or a ZC sequence with a length of n×L (as shown in Table 2, Table 3a and Table 3b), and it also can be composed of n CG-ZC sequences or n ZC sequences with lengths of L, wherein L is the number of subcarriers contained in one physical resource block.

TABLE 2

| 30 CG-ZC sequences with lengths of 12 | | | | | | | | | | | |
|---|---|---|---|---|---|---|---|---|---|---|---|
| u | $\phi(0), \ldots, \phi(11)$ | | | | | | | | | | |
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |

TABLE 2-continued

30 CG-ZC sequences with lengths of 12

| u | $\phi(0),\ldots,\phi(11)$ | | | | | | | | | | | |
|---|---|---|---|---|---|---|---|---|---|---|---|---|
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 3 | 1 | -1 | 1 | -3 | -1 |  |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 3a

Values of the first 12 bits in 30 CG-ZC sequences with lengths of 24

| u | $\phi(0),\ldots,\phi(11)$ | | | | | | | | | | | |
|---|---|---|---|---|---|---|---|---|---|---|---|---|
| 0 | -1 | 3 | 1 | -3 | 3 | -1 | 1 | 3 | -3 | 3 | 1 | 3 |
| 1 | -3 | 3 | -3 | -3 | -3 | 1 | -3 | -3 | 3 | -1 | 1 | 1 |
| 2 | 3 | -1 | 3 | 3 | 1 | 1 | -3 | 3 | 3 | 3 | 3 | 1 |
| 3 | -1 | -3 | 1 | 1 | 3 | -3 | 1 | 1 | -3 | -1 | -1 | 1 |
| 4 | -1 | -1 | -1 | -3 | -3 | -1 | 1 | 1 | 3 | 3 | -1 | 3 |
| 5 | -3 | 1 | 1 | 3 | -1 | 1 | 3 | 1 | -3 | 1 | -3 | 1 |
| 6 | 1 | 1 | -1 | -1 | 3 | -3 | -3 | 3 | -3 | 1 | -1 | -1 |
| 7 | -3 | 3 | 3 | -1 | -1 | -3 | -1 | 3 | 1 | 3 | 1 | 3 |
| 8 | -3 | 1 | 3 | -3 | 1 | -1 | 3 | 3 | 3 | -1 | -1 |  |
| 9 | 1 | 1 | -3 | 3 | 3 | -1 | -3 | -1 | 3 | -3 | 3 | 3 |
| 10 | 1 | 1 | -3 | -3 | 3 | -1 | -1 | -3 | -3 | -3 | -3 |  |
| 11 | 1 | 3 | 3 | -3 | -3 | 1 | 3 | 1 | -1 | -3 | -3 | -3 |
| 12 | 1 | 3 | 3 | 1 | 1 | 1 | -1 | -1 | 1 | -3 | 3 | -1 |
| 13 | 3 | -1 | -1 | -1 | -1 | -3 | -1 | 3 | 3 | 1 | -1 | 1 |
| 14 | -3 | -3 | 3 | 1 | 3 | 1 | -3 | 3 | 1 | 3 | 1 | 1 |
| 15 | -1 | -1 | 1 | -3 | 1 | 3 | -3 | 1 | -1 | -3 | -1 | 3 |
| 16 | -1 | -3 | 3 | -1 | -1 | -1 | -1 | 1 | 1 | -3 | 3 | 1 |
| 17 | 1 | 3 | -1 | 3 | 3 | -1 | -3 | 1 | -1 | -3 | 3 | 3 |
| 18 | 1 | 1 | 1 | 1 | 1 | -1 | 3 | -1 | -3 | 1 | 1 | 3 |
| 19 | 1 | 3 | 3 | 1 | -1 | -3 | 3 | -1 | 3 | 3 | 3 | 3 |
| 20 | -1 | -3 | 3 | -3 | -3 | -3 | -1 | -1 | -3 | -1 | -3 | 3 |
| 21 | -3 | -3 | 1 | 1 | -1 | 1 | -1 | 1 | -1 | 3 | 1 | -3 |
| 22 | -3 | -1 | -3 | 3 | 1 | -1 | -3 | -1 | -3 | -3 | 3 | -3 |
| 23 | -1 | -1 | -1 | -1 | 3 | 3 | 3 | 1 | 3 | 3 | -3 | 1 |
| 24 | 1 | -1 | 3 | 3 | -1 | -3 | 3 | -3 | -1 | -1 | 3 | -1 |
| 25 | 1 | -1 | 1 | -1 | 3 | -1 | 3 | 1 | 1 | -1 | -1 | -3 |
| 26 | -3 | -1 | 1 | 3 | 1 | 1 | -3 | -1 | -1 | 3 | 3 | -3 |
| 27 | -1 | -3 | 3 | 3 | 1 | 1 | 3 | -1 | -3 | -1 | -1 | -1 |
| 28 | -1 | -3 | -1 | -1 | 1 | -3 | -1 | -1 | 1 | -1 | -3 | 1 |
| 29 | 1 | 1 | -1 | -1 | -3 | -1 | 3 | -1 | 3 | -1 | 1 | 3 |

TABLE 3b

Values of the first 12 bits in 30 CG-ZC sequences with lengths of 24

| u | $\phi(12),\ldots,\phi(23)$ | | | | | | | | | | | |
|---|---|---|---|---|---|---|---|---|---|---|---|---|
| 0 | -3 | 3 | 1 | 1 | -1 | -1 | 3 | -3 | 3 | -3 | -1 | -3 |
| 1 | 1 | 3 | 1 | -1 | 3 | -3 | -3 | 1 | 3 | 1 | 1 | -3 |
| 2 | -1 | 3 | -1 | 1 | 1 | -3 | -1 | -1 | 1 | 3 | 3 |  |
| 3 | 3 | 1 | 3 | 1 | -1 | 3 | 1 | 1 | -3 | -1 | -3 | -1 |
| 4 | -1 | 1 | -1 | -3 | 1 | -1 | -3 | -3 | 1 | -3 | -1 | -1 |
| 5 | 1 | -1 | -1 | 3 | -1 | -3 | 3 | -3 | -3 | -3 | 1 | 1 |

TABLE 3b-continued

Values of the first 12 bits in 30 CG-ZC sequences with lengths of 24

| u | $\phi(12),\ldots,\phi(23)$ | | | | | | | | | | | |
|---|---|---|---|---|---|---|---|---|---|---|---|---|
| 6 | 1 | -1 | 1 | 1 | -1 | -3 | -1 | 1 | -1 | 3 | -1 | -3 |
| 7 | 1 | 1 | -1 | 3 | 1 | -1 | 1 | 3 | -3 | -1 | -1 | 1 |
| 8 | -1 | -1 | 1 | -3 | -3 | -3 | 1 | -3 | -3 | -3 | 1 | -3 |
| 9 | 3 | -1 | 1 | 1 | -3 | 1 | -1 | 1 | 1 | -3 | 1 | 1 |
| 10 | -1 | -3 | -3 | 1 | -1 | 1 | 3 | 3 | -1 | 1 | -1 | 3 |
| 11 | 3 | 3 | -3 | 3 | 3 | -1 | -3 | 3 | -1 | 1 | -3 | 1 |
| 12 | 1 | 1 | -3 | 3 | 3 | -1 | -3 | 3 | -3 | -1 | -3 | -1 |
| 13 | 3 | 3 | 3 | -1 | 1 | 1 | -3 | 1 | 3 | -1 | -3 | 3 |
| 14 | 3 | 3 | -1 | -1 | 1 | -3 | -1 | 3 | 1 | 1 | 3 |  |
| 15 | 1 | 3 | -1 | -1 | -3 | -3 | -1 | -1 | -3 | -3 | -3 | -1 |
| 16 | 3 | 3 | 1 | -1 | 1 | -3 | 1 | -3 | 1 | 1 | -3 | -1 |
| 17 | 3 | -1 | 1 | 1 | 3 | -1 | -3 | -1 | 3 | -1 | -1 | -1 |
| 18 | -3 | 1 | -3 | -1 | 1 | 1 | -3 | 3 | 1 | 1 | 3 | -3 |
| 19 | 1 | -1 | -1 | -3 | -1 | 1 | 3 | -1 | 3 | -3 | -3 | -3 |
| 20 | 1 | 3 | -3 | -1 | 3 | -1 | 1 | -1 | 3 | -3 | 1 | -1 |
| 21 | -1 | 1 | -1 | 1 | -1 | -1 | 3 | 3 | -3 | -1 | 1 | -3 |
| 22 | 3 | -3 | -1 | 1 | 3 | 1 | -3 | 1 | 3 | 3 | -1 | -3 |
| 23 | 3 | -1 | 3 | -1 | 3 | -3 | 3 | 1 | -1 | 3 | 3 |  |
| 24 | 3 | -1 | -1 | 1 | 1 | 1 | -1 | -1 | -3 | -1 | 3 |  |
| 25 | 1 | 1 | -3 | 1 | 3 | -3 | 1 | 1 | -3 | -3 | -1 | -1 |
| 26 | 3 | 1 | -3 | 3 | -3 | 1 | -1 | -3 | 1 | 1 | 1 |  |
| 27 | 3 | 1 | -3 | -3 | -1 | 3 | -3 | -1 | -3 | -1 | -3 | -1 |
| 28 | 1 | -3 | 1 | -3 | -3 | 3 | 1 | 1 | -1 | 3 | -1 | -1 |
| 29 | 1 | -1 | 3 | 1 | 3 | -3 | -3 | 1 | -1 | -1 | 1 | 3 |

It is assumed that the total bandwidth is N and physical resource block indexes are numbered from 0, when a physical resource block index occupied by an uplink SC-FDMA symbol within a first timeslot in the subframe is m, a physical resource block index occupied by an uplink SC-FDMA symbol within a second timeslot in the subframe can be either N−1−m or m. The channel resource information can be configured to the above UE through upper layer signalings.

When h uplink SC-FDMA symbols are contained in one timeslot, mapping the data which go through the time domain extension and the demodulation reference signals corresponding to the data which go through the time domain extension to multiple uplink SC-FDMA symbols within the subframe means: mapping respectively the data which go through the time domain extension to f uplink SC-FDMA symbols within each timeslot in the subframe, and mapping respectively the demodulation reference signals corresponding to the data which go through the time domain extension to another g uplink SC-FDMA symbols within each timeslot in the subframe, that is, the data transmitted on two timeslots within the same subframe are identical after completing the mapping; or, mapping a part of the data which go through the time domain extension to f uplink SC-FDMA symbols within the first timeslot in the subframe, mapping another part of the data to f uplink SC-FDMA symbols within the second timeslot in the subframe, and mapping demodulation reference signals corresponding to all parts of the mapped data correspondingly to another g uplink SC-FDMA symbols within corresponding timeslots in the subframe, that is, the data transmitted on two timeslots within the same subframe are different after completing the mapping. Wherein, h=f+g, and f is a time domain extended code length.

In the specific implementation, performing time domain extension on the feedback information means: extending an encoded sequence to a corresponding uplink SC-FDMA symbol by using an orthogonal sequence, and the orthogonal sequence can be a Discrete Fourier Transform (DFT) sequence. Specifically, it includes: performing encoding, scrambling and/or interleaving and modulation on the data, and then performing DFT on data which go through the above processing. Wherein, the order of the scrambling, interleaving and modulation can be changed arbitrarily.

Wherein, the interleaving method is to perform interleaving on feedback information to be interleaved according to a sequence $\{x_0, x_1, \ldots, x_{B-1}\}$, $x_0, x_1, \ldots, x_{B-1}$ is a positive integer sequence from 1 to B, wherein, B is an interleaved sequence length; or the interleaving method is a interleaving method according to row-wise write and column-wise read;

an encoding method can be RM (32, O) encoding or convolutional encoding. When a convolutional encoding way is used, it is also required to perform encoding on Cyclic Redundancy Check (CRC) codes and the above feedback information together. After going through the encoding, O bits of the feedback information turn into n×L×Q×2 bits (applied to a situation that data transmitted on two timeslots within the same subframe are different) or L×Q×n bits (applied to a situation that data transmitted on two timeslots within the same subframe are identical), wherein, Q represents the number of bits corresponding to one modulation symbol, L is the number of subcarriers contained in one physical resource block, each uplink SC-FDMA symbol occupies n successive physical resource blocks in the frequency domain, and O represents the amount of feedback information required to be encoded, which is equivalent to the number of original bits, namely the number of bits before the encoding; Y represents the number of groups when the feedback information is encoded in group, and it is a positive integer.

When the encoding is performed, the above O bits of the feedback information can be firstly divided into Y groups, and then each group of data is encoded respectively. It is assumed that, if the length of the ith group of data is $Z_i$ after the encoding, $$\sum_{i=0}^{Y-1} Z_i = n \times L \times Q \times 2$$

(applied to a situation that the data transmitted on two timeslots within the same subframe are different) or $$\sum_{i=0}^{Y-1} Z_i = n \times L \times Q$$

(applied to a situation that the data transmitted on two timeslots within the same subframe are identical). After the encoding is completed, all groups of encoded data can be concatenated in order, such as $b_0^0, \ldots, b_{B-1}^0, b_0^j, \ldots, b_{B-1}^j$; or all groups of encoded data can be interleaved, such as $b_0^0, \ldots, b_0^j, \ldots, b_{B-1}^0 \ldots, b_{B-1}^j$; or all groups of encoded data can be interleaved by block, for example, the data in each group are respectively divided into two blocks in order, and blocks in each group are interleaved, for example, in two groups of data, if 24 bits are contained in each group, a result after the concatenating is $b_0^0, \ldots, b_0^j, \ldots, b_{B-1}^0 \ldots, b_{B-1}^j$;

Preferably, the group division method can be any one of the following three ways:

way 1: starting from the first bit in a sequence composed of the above feedback information, performing division into Y groups in order, except the last group, there are $$\left\lfloor \frac{O}{Y} \right\rfloor$$

bits contained in each group, and the number of bits contained in the last group can be equal to or greater than $$\left\lfloor \frac{O}{Y} \right\rfloor$$

bits; wherein, the symbol $\lfloor\ \rfloor$ represents rounding down;

way 2: performing modulo operation between the location in which each bit is located in the sequence composed of the above feedback information and the Y, and classifying bits with identical modulo values under a group;

way 3: when the feedback information is channel state information, classifying bits representing feedback information corresponding to each cell under a group correspondingly;

way 4: starting from the first bit in the sequence composed of the above feedback information, performing division into Y groups in order, wherein the number of bits contained in each group of O mod Y groups is $$\left\lfloor \frac{O}{Y} \right\rfloor + 1,$$

and the number of bits contained in each group of remaining Y−(O mod Y) groups is $$\left\lfloor \frac{O}{Y} \right\rfloor.$$

mod represents modulo.

Moreover, performing DFT on the data which go through the above processing can be: performing DFT processing on all data in a time domain, or performing DFT processing on data of each physical resource block in the time domain respectively.

In one example, the total bandwidth is N, physical resource block indexes are numbered from 0, a physical resource block index occupied by a channel which transmits the above feedback information with the above method on the first timeslot in one subframe is m, and a physical resource block index on the second timeslot in the subframe is N−1-m, and, original O bits of the feedback information are encoded as n×L×Q×2 bits, and an RM (32, O) encoding way is used, wherein, n=1, L=12 and Q=2, and a Quadrature Phase Shift Keying (QPSK) modulation mode is used. The time domain length of the channel structure is one subframe, when a cyclic prefix is a normal cyclic prefix, the number of uplink SC-FDMA symbols corresponding to the data which go through the time domain extension is 5, the number of uplink SC-FDMA symbols corresponding to the demodulation reference signals is 2 and they are located on the 2nd uplink SC-FDMA symbol and the 6th uplink SC-FDMA symbol of each timeslot; and when the cyclic prefix is an extended cyclic prefix, the number of uplink SC-FDMA symbols corresponding to the data which go through the time domain extension is 5, the number of uplink SC-FDMA symbols corresponding to the demodulation reference signals is 1 and it is located on the 3rd uplink SC-FDMA symbol or the 4th uplink SC-FDMA symbol of each timeslot, and a time domain extended code is a 5-order DFT sequence, and at this point, the channel structure is a PUCCH Format 3.

In another example, the total bandwidth is N, physical resource block indexes are numbered from 0, a physical resource block index occupied by a channel which transmits the above feedback information with the above method on the first timeslot in one subframe is m, and a physical resource block index occupied on the second timeslot in the subframe is N−1-m, and the time domain length of the channel structure is one subframe, when a cyclic prefix is a normal cyclic prefix, the number of uplink SC-FDMA symbols corresponding to the data which go through the time domain extension is 5, the number of uplink SC-FDMA symbols corresponding to the demodulation reference signals is 2 and they are located on the 2nd uplink SC-FDMA symbol and the 6th uplink SC-FDMA symbol of each timeslot; and when the cyclic prefix is an extended cyclic prefix, the number of uplink SC-FDMA symbols corresponding to the data is 5, the number of uplink SC-FDMA symbols corresponding to the demodulation reference signals is 1 and it is located on the 3rd uplink SC-FDMA symbol or the 4th uplink SC-FDMA symbol of each timeslot, and a time domain extended code is a 5-order DFT sequence. Original O bits of the feedback information are divided into Y groups, and RM (32, O) encoding is performed on each group of data respectively, and the length of the ith group of data is L×Q after the encoding, wherein, Y=2, L=12 and Q=2, and a QPSK modulation mode is used; or, convolutional encoding is performed on the original O bits of the feedback information, and the length is L×Q×n×2 after encoding, wherein, Y=2, n=1, L=12 and Q=2, and the QPSK modulation mode is used; after performing encoding on the data, scrambling and/or interleaving and modulation are performed (or the scrambling and modulation are performed after performing encoding on the data, and the interleaving is performed or not performed at last), wherein, the interleaving method is to perform interleaving according to a fixed sequence, or according to a row-wise write and column-wise read interleaving method, or according to a block interleaving method.

In another example, the total bandwidth is N, physical resource block indexes are numbered from 0, a physical resource block index occupied by a channel which transmits the above feedback information with the above method on the first timeslot in one subframe is m, and a physical resource block index occupied on the second timeslot in the subframe is N−1-m, and the time domain length of the channel structure is one subframe, and when a cyclic prefix is a normal cyclic prefix, the number of uplink SC-FDMA symbols corresponding to the data which go through the time domain extension is 5, the number of uplink SC-FDMA symbols corresponding to the demodulation reference signals is 2 and they are located on the 2nd uplink SC-FDMA symbol and the 6th uplink SC-FDMA symbol of each timeslot; and when the cyclic prefix is an extended cyclic prefix, the number of uplink SC-FDMA symbols corresponding to the data which go through the time domain extension is 5, the number of uplink SC-FDMA symbols corresponding to the demodulation reference signals is 1 and it is located on the 3rd uplink SC-FDMA symbol or the 4th uplink SC-FDMA symbol of each timeslot, and the time domain extended code is a 5-order DFT sequence. Original O bits of the feedback information are divided into Y groups, RM (32, O) encoding is performed on each group of data respectively, and the length of the ith group of data after encoding is L×Q×2 or L×Q, wherein, Y=2, n=2, L=12 and Q=2, and the QPSK modulation mode is used; or, convolutional encoding is performed on the original O bits, and the length after encoding is L×Q×2×n or L×Q×n, wherein, Y=2, n=2, L=12 and Q=2, and the QPSK modulation mode is used. When the QPSK modulation mode is used, Q=2, when the 16 Quadrature Amplitude Modulation (QAM) modulation mode is used, Q=4, and when the 64 QAM modulation mode is used, Q=6; after performing encoding on the data, scrambling and/or interleaving and modulation are performed (or, after performing encoding on the data, the scrambling, modulation and/or interleaving are performed), wherein, the interleaving method is to perform interleaving according to a fixed sequence, or to perform interleaving according to row-wise write and column-wise readers, or to perform interleaving according to a block interleaving method.

A user equipment of the example of the present invention includes a time domain extension module and a data transmission module; the time domain extension module is configured to: perform time domain extension on feedback information within one subframe; and the data transmission module is configured to: map extended data obtained by the time domain extension module and demodulation reference signals corresponding to the extended data respectively to multiple uplink SC-FDMA symbols within the subframe, and transmit the extended data and the demodulation reference signals corresponding to the extended data in a same frequency domain position in a way of time division multiplexing; wherein, each uplink SC-FDMA symbol occupies n successive physical resource blocks in the frequency domain, and n is a positive integer.

In addition, the time domain extension module is configured to perform time domain extension on the feedback information within one subframe in the following way: performing encoding, scrambling and/or interleaving and modulation on the above feedback information, and then performing Discrete Fourier Transform (DFT) on data which go through the above processing, wherein, the processing sequence of the scrambling, interleaving and modulation is arbitrary.

The present document also provides a user equipment, the user equipment includes a group division module and a transmission module; the group division module is configured to: divide feedback information into n groups; and the transmission module is configured to: transmit each group of data correspondingly through one PUCCH of which a format is PUCCH Format 2 or PUCCH Format 3; wherein, n is 2, and PUCCHs bearing the data occupy a same physical resource block or adjacent physical resource blocks in the frequency domain.

Wherein, the group division module is configured to divide the feedback information into n groups in the following way: starting from the first bit in a sequence composed of O bits of feedback information, performing division into n groups in order, except the last group, there are $$\left\lfloor \frac{O}{n} \right\rfloor$$

bits contained in each group, and the number of bits contained in the last group is equal to or greater than $$\left\lfloor \frac{O}{n} \right\rfloor$$

bits;

or performing modulo operation between the location in which each bit is located in a sequence composed of the feedback information and the n, and classifying bits with identical modulo values under a group;

or, when feedback information is channel state information, classifying bits representing feedback information corresponding to each cell under a group correspondingly;

or, starting from the first bit in the sequence composed of the feedback information, performing division into n groups in order, wherein the number of bits contained in each group of O mod n groups is $$\left\lfloor \frac{O}{n} \right\rfloor + 1,$$

and the number of bits contained in each group of remaining n−(O mod n) groups is $$\left\lfloor \frac{O}{n} \right\rfloor.$$

The present invention will be further described through 4 examples below.

Example 1

Figure 1:
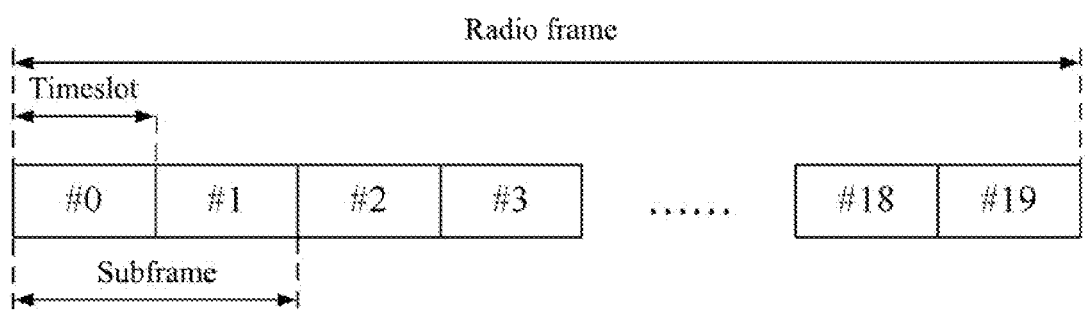
FIG. 1 is a schematic diagram of frame structure in a FDD system in the related art.
Figure 2:
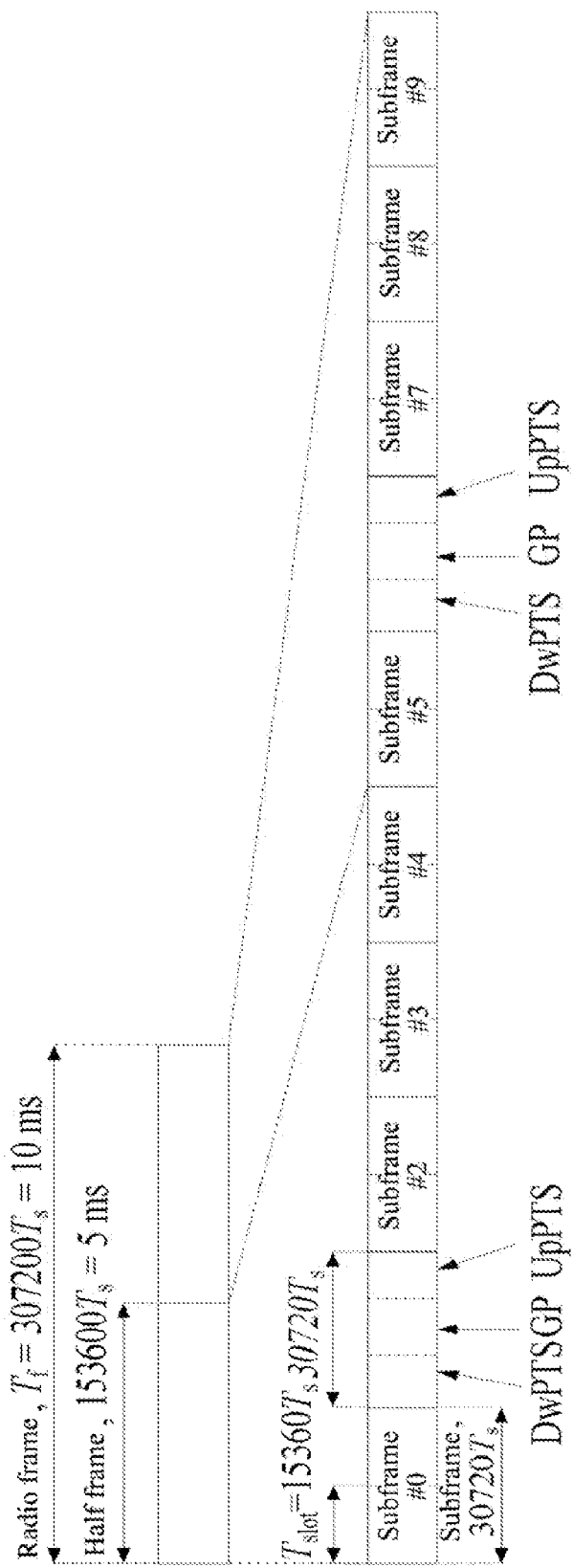
FIG. 2 is a schematic diagram of frame structure in a TDD system in the related art.
Figure 3:
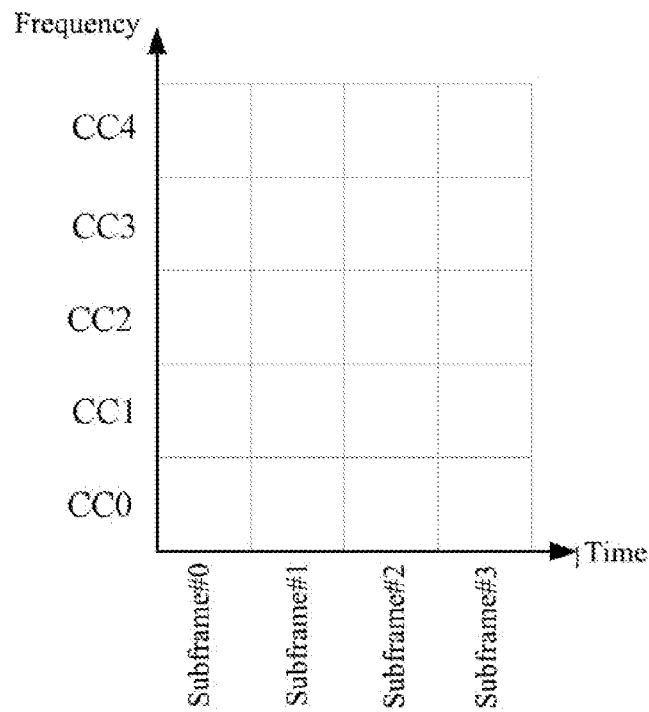
FIG. 3 is a schematic diagram of downlink scheduling window corresponding to one uplink subframe in a carrier aggregation scenario in the related art.
Figure 4A:
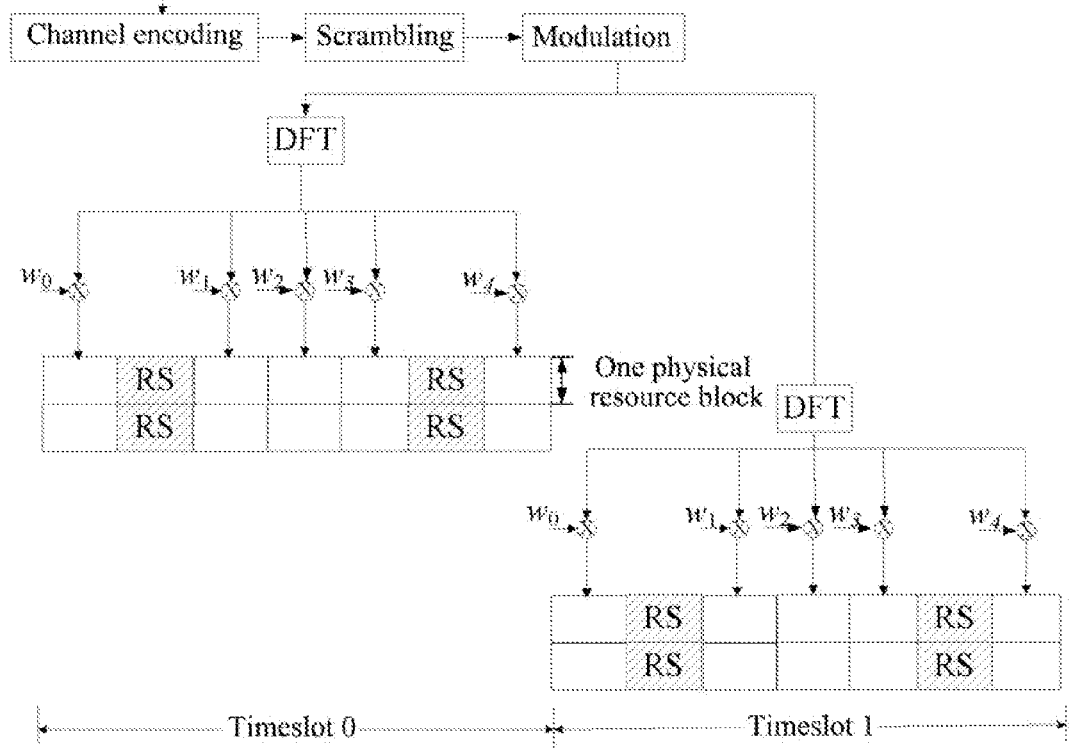
FIG. 4a and FIG. 4b are respectively schematic diagrams of channel structures of the PUCCH Format X in the situations of normal cyclic prefix and extended cyclic prefix when n=2.
Figure 4B:
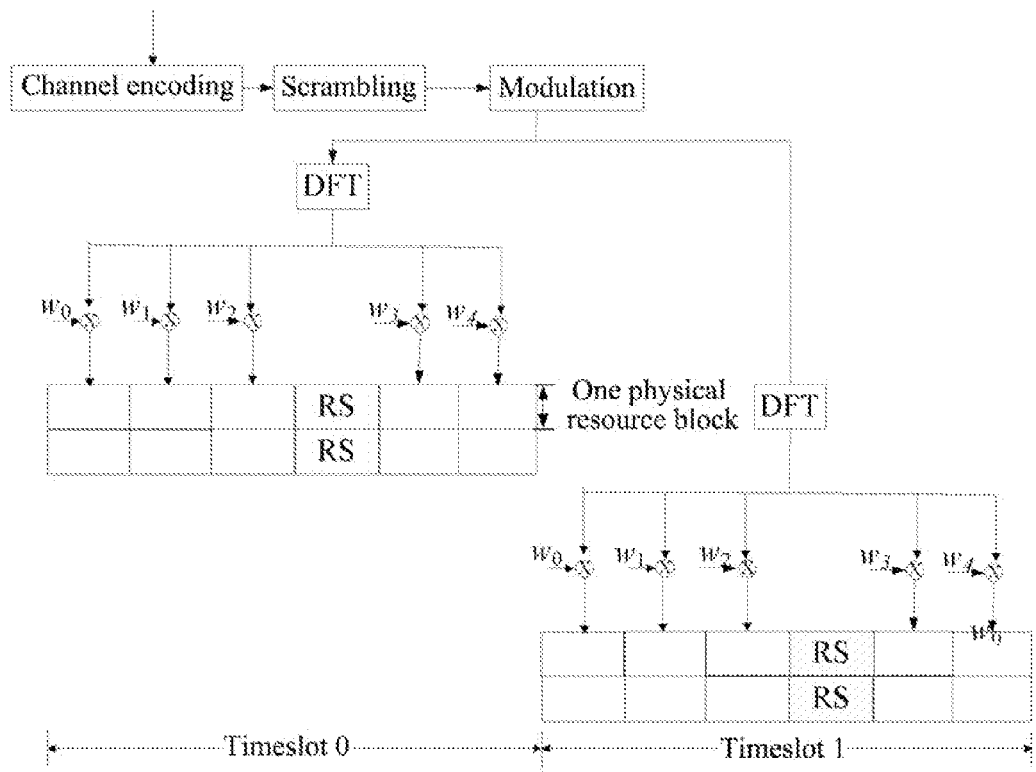

A PUCCH Format X is used to transmit feedback information;

In a carrier aggregation scenario, when n=2, channel structures of the PUCCH Format X are as shown in FIG. 4a and FIG. 4b, wherein RS represents demodulation reference signals, and it is described specifically as follows.

n successive physical resource blocks are occupied in a frequency domain, and time domain extension is performed for data on one uplink SC-FDMA symbol, and the data after the time domain extension are mapped to an uplink SC-FDMA symbol in a corresponding time domain, and the demodulation reference signals and data are transmitted in a same frequency domain position in a way of time division multiplexing;

the total bandwidth is N, and physical resource block indexes are numbered from 0, if a physical resource block index of the channel in the first timeslot is m, a physical resource block index in the second timeslot is N−1−m. A time domain length of the channel structure is one subframe, when a cyclic prefix is a normal cyclic prefix, as shown in FIG. 4a, the number of uplink SC-FDMA symbols corresponding to the data is 5, the number of uplink SC-FDMA symbols corresponding to the demodulation reference signals is 2 and they are respectively located on the 2nd uplink SC-FDMA symbol and the 6th uplink SC-FDMA symbol of each timeslot; and when the cyclic prefix is an extended cyclic prefix, as shown in FIG. 4b, the number of uplink SC-FDMA symbols corresponding to the data is 5, the number of uplink SC-FDMA symbols corresponding to the demodulation reference signals is 1 and it is located on the 3rd uplink SC-FDMA symbol or the 4th uplink SC-FDMA symbol of each timeslot. As shown in Table 4, a time domain extended code is a 5-order DFT sequence.

TABLE 4

| DFT sequence | |
|---|---|
| Sequence index | Sequence [w(0) Λ w(4)] |
| 0 | [1 1 1 1 1] |
| 1 | [1 $e^{j8\pi/5}$ $e^{j6\pi/5}$ $e^{j4\pi/5}$ $e^{j2\pi/5}$] |
| 2 | [1 $e^{j6\pi/5}$ $e^{j2\pi/5}$ $e^{j8\pi/5}$ $e^{j4\pi/5}$] |
| 3 | [1 $e^{j4\pi/5}$ $e^{j8\pi/5}$ $e^{j2\pi/5}$ $e^{j6\pi/5}$] |
| 4 | [1 $e^{j2\pi/5}$ $e^{j4\pi/5}$ $e^{j6\pi/5}$ $e^{j8\pi/5}$] |

Encoding Scheme 1

Original O bits of the feedback information are divided into Y groups, and RM (32, O) encoding is performed on each group of data respectively, and the length of the ith group of data after encoding is L×Q×2 or L×Q, wherein, Y=n=2, L=12 and Q=2, and a QPSK modulation mode is used; or convolutional encoding is performed on the original O bits of the feedback information, and the length is L×Q×2×n or L×Q×n after the encoding, wherein, Y=n=2, L=12 and Q=2, and the QPSK modulation mode is used.

In the above encoding scheme, a group division way of the first $$\left\lfloor \frac{O}{2} \right\rfloor$$

bits belonging to a group and the remaining bits belonging to a group can be used; or, a group division way of data in an even bit belonging to a group and data in an odd bit belonging to a group can be used.

During the specific implementation, a specific encoding way of the used RM (32, O) encoding is: the fundamental sequence length performing encoding on multiple feedback information including specifically:

$$b_i = \sum_{n=0}^{M_j-1} (O_n \cdot M_{mod(i,N),h}) \bmod 2,$$

wherein, i=0, 1, 2, . . . , $B_j$−1, $b_0^j$, $b_1^j$ . . . , $b_{B_j-1}^j$ represents a bit sequence obtained after encoding the jth group, $B_j$ represents the length of the jth group of data after going through the encoding, if the information borne on two timeslots within one subframe is identical, $B_j$=L×Q; and if the information borne on two timeslots within one subframe is different, $B_j$=2×L×Q. N represents the fundamental sequence length, $M_{i,h}$ represents the value of serial number i in a fundamental sequence h, $O_0^j$, $O_1^j$, K, $O_{M_j-1}^j$ represents a bit sequence of feedback information included in the jth group of data, $M_j$ represents the number of bits contained in the jth group of data, fundamental sequences are as shown in Table 5, and the fundamental sequences also can be in the form where the line replacement has been performed on the fundamental sequences of Table 5.

TABLE 5

Fundamental sequences

| i | Mi, 0 | Mi, 1 | Mi, 2 | Mi, 3 | Mi, 4 | Mi, 5 | Mi, 6 | Mi, 7 | Mi, 8 | Mi, 9 | Mi, 10 |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Each group of encoded bit sequences which are output after going through the encoding is $b_0, b_1 \ldots, b_{B-1}$, wherein, B represents the number of bits after the encoding, if the information borne on two timeslots within the same subframe is identical, $B=n \times L \times Q$; and if the information borne on two timeslots within the same subframe is different, $B=2 \times n \times L \times Q$;

all groups of the bits can be concatenated in order, such as $b_0^0, \ldots, b_{B-1}^0, \ldots, b_0^j, \ldots, b_{B-1}^j$, and also can be interleaved, such as $b_0^0, \ldots, b_0^j, \ldots, b_{B-1}^0, \ldots, b_{B-1}^j$.

Encoding Scheme 2

Figure 5:
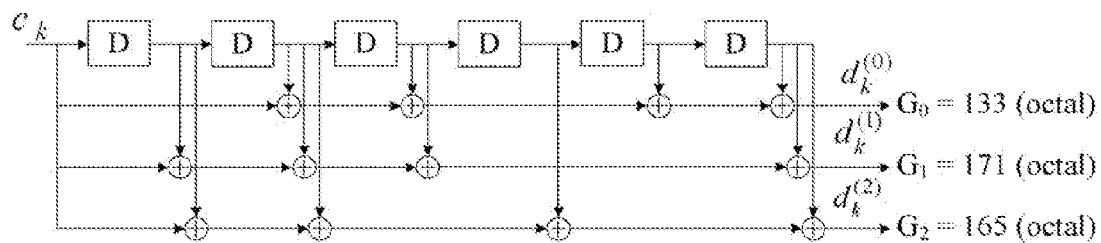
FIG. 5 is a schematic diagram of tail-biting convolutional code in the example of the present invention.

Feedback information $O_0, O_1, \ldots O_{M-1}$ is encoded by using a tail-biting convolutional code with a constraint length of 7 and a code rate of ⅓ as shown in FIG. 5; wherein, $b_0, b_1, \ldots, b_{B-1}$ represents a bit sequence after the encoding, B represents a length after the encoding, if the information borne on two timeslots within the same subframe is identical, $B=n \times L \times Q$, and if the information borne on two timeslots within the same subframe is different, $B=2 \times n \times L \times Q$;

the above interleaving process is to convert the encoded sequence $b_0, \ldots, b_1, \ldots, b_{B-1}$ to obtain $b'_0, \ldots, b'_1, \ldots, b'_{B-1}$ according to a certain rule (such as performing interleaving according to a fixed sequence, or performing interleaving according to a row-wise write and column-wise read method, or performing interleaving according to a block interleaving method); wherein, the scrambling process can be that modulo-2 is performed after adding a scrambling sequence $c_0, \ldots, c_1, \ldots, c_{B-1}$ and the sequence $b'_0, \ldots, b'_1, \ldots, b'_{B-1}$ obtained after the encoding and interleaving (or the sequence $b_0, \ldots, b_1, \ldots, b_{B-1}$ obtained after the encoding), to obtain a scrambled sequence $q_0, \ldots, q_1, \ldots, q_{B-1}$, namely $q_i = \mod((c_i+b'_i), 2)$, wherein, $i=0, 1, \ldots, B-1$, and the scrambling sequence can be composed of pseudorandom sequences. The interleaving process is an optional process.

For example, when the number of bits to be interleaved is 48, interleaving is performed on the bits to be interleaved according to a fixed sequence $\{x_0, x_1 \ldots, x_{B-1}\}$, and $x_0, x_1 \ldots, x_{B-1}$ a positive integer sequence from 1 to B;

a QPSK modulation mode is used, and a modulated sequence is $$Q_0, Q_1, L, Q_{\frac{B}{Q_m}-1},$$

wherein, $Q_m=2$.

Figure 6A:
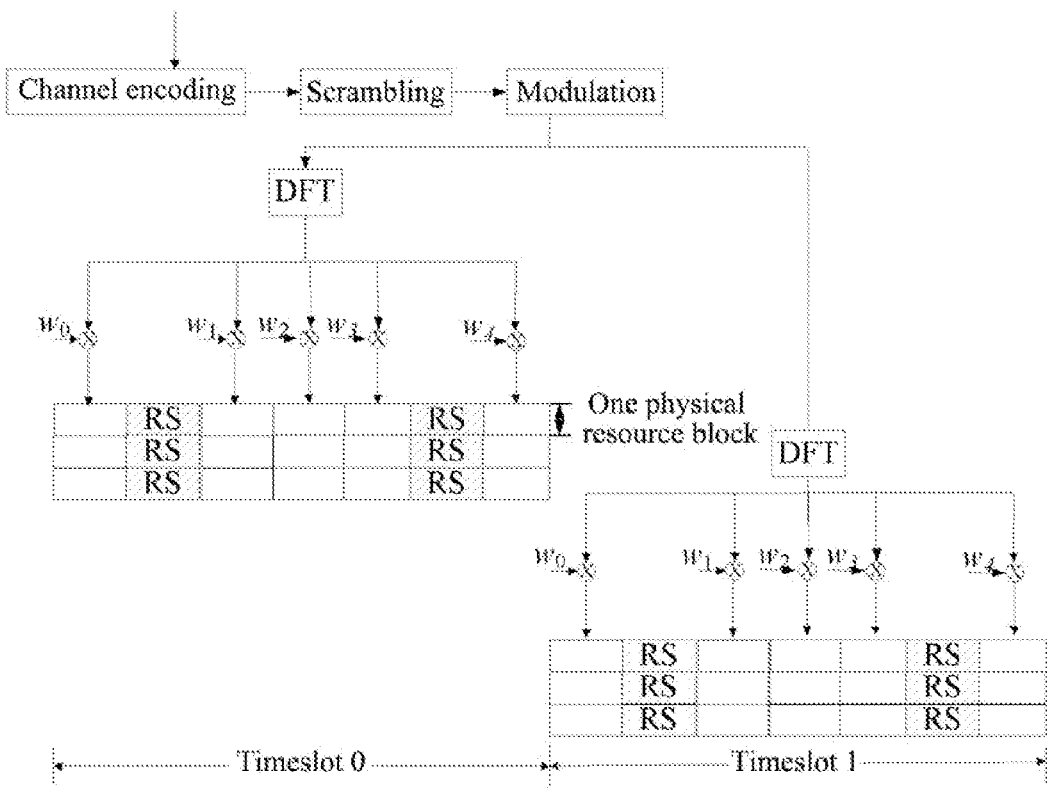
FIG. 6a and FIG. 6B are respectively schematic diagrams of channel structures of the PUCCH Format X in the situations of normal cyclic prefix and extended cyclic prefix when n=3.
Figure 6B:
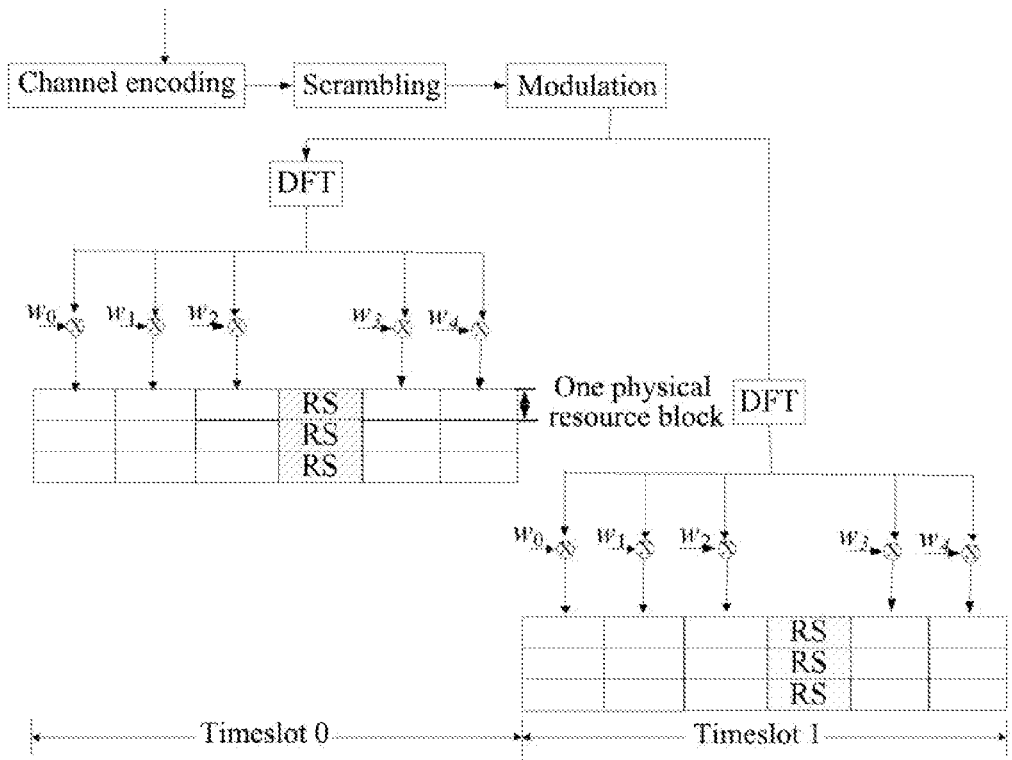

In the same structure and encoding process, when n=3, the channel structures are as shown in FIG. 6a and FIG. 6b; when encoding is performed on the feedback information in group, the group division is performed in a way of the first $$\left\lfloor \frac{O}{3} \right\rfloor$$

bits belonging to a group, the $$\left\lfloor \frac{O}{3} \right\rfloor + \text{1st bit to } \left\lfloor \frac{O}{3} \right\rfloor \times \text{2nd bit}$$

belonging to a group and the remainder bits belonging to a group;

or, bits with identical modulo values are classified under a group after bit locations modulo 3 is performed.

or, when the feedback information is channel state information, the feedback information corresponding to each cell is in a group;

the number of bits in O mod Y groups is $$\left\lfloor \frac{O}{Y} \right\rfloor + 1,$$

and the number of bits in Y−(O mod Y) groups is $$\left\lfloor \frac{O}{Y} \right\rfloor;$$

The channel in the example can be applied when the number of bits of ACK/NACK feedback information in TDD is greater than 11 in the carrier aggregation or when a UE needs to perform feedback of channel state information of r downlink cells simultaneously.

Example 2

Feedback information are transmitted on adjacent physical resource blocks or the same physical resource block by using n PUCCH Formats 3, wherein n is 2;

the feedback information are divided into n groups, each group of feedback information corresponds to one PUCCH Format 3, and each PUCCH Format 3 transmits the data in a corresponding group;

a group division method is classifying the first $$\left\lfloor \frac{O}{2} \right\rfloor$$

bits under a group and classifying the remainder bits under a group; or bits in the even bit are in a group and bits in the odd bit are in a group; or when the feedback information is channel state information, the feedback information corresponding to each cell is in a group.

Channel resources of the n PUCCH Formats 3 are configured by upper layer signalings;

the feedback information bits transmitted by the channel can be one or multiple kinds of ACK/NACK information, channel state information, rank indication information and scheduling request information.

Example 3

Feedback information are transmitted on adjacent physical resource blocks or the same physical resource block by using n PUCCH Formats 2, wherein n is 2;

the feedback information can be divided into n groups, each group of feedback information corresponds to one PUCCH Format 2, and each PUCCH Format 2 transmits the feedback information in a corresponding group.

A group division method is classifying the first $$\left\lfloor \frac{O}{2} \right\rfloor$$

bits under a group and classifying the remainder bits under a group; or bits in the even bit are in a group and bits in the odd bit are in a group; or when the feedback information is channel state information, the feedback information corresponding to each cell is in a group.

Channel resources of the n PUCCH Formats 2 can be configured by upper layer signalings;

the feedback information bits transmitted by the channel can be one or multiple kinds of ACK/NACK information, channel state information, rank indication information and scheduling request information.

Example 4

Figure 7A:
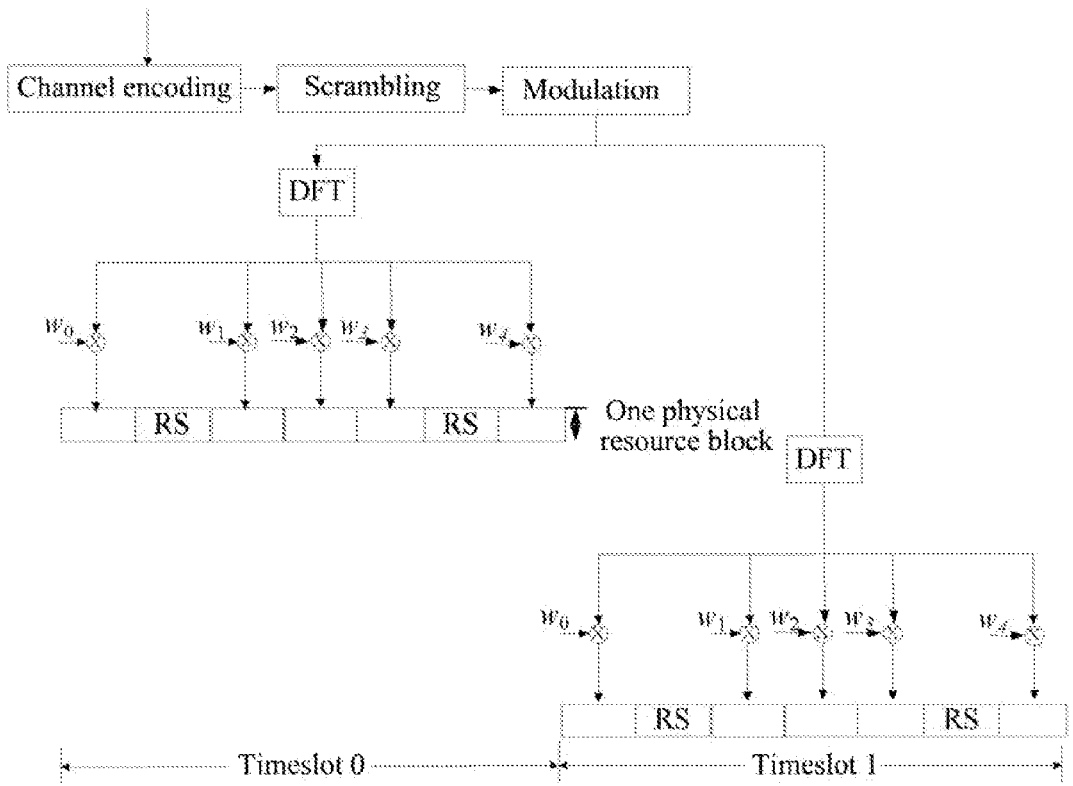
FIG. 7a and FIG. 7b are respectively schematic diagrams of channel structures of the PUCCH Format X in the situations of normal cyclic prefix and extended cyclic prefix when n=1.
Figure 7B:
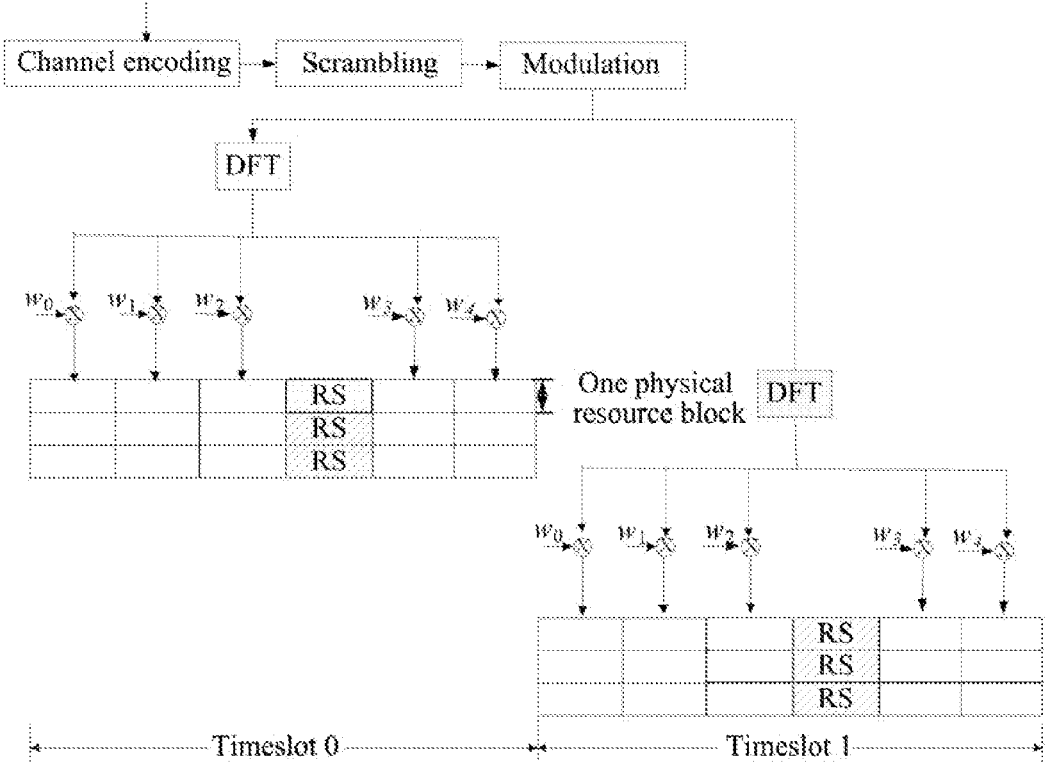

In a carrier aggregation scenario, a PUCCH Format X is used to transmit feedback information;

when n is 1, a channel structure is as shown in FIG. 7, and it is described specifically as follows.

n successive physical resource blocks are occupied in a frequency domain, and time domain extension is performed for data on one uplink SC-FDMA symbol, and the data after the time domain extension are mapped to an uplink SC-FDMA symbol in a corresponding time domain, and demodulation reference signals and data are transmitted in a same frequency domain position in a way of time division multiplexing;

the total bandwidth is N, physical resource block indexes are numbered from 0, a physical resource block index of the channel in the first timeslot is m, a physical resource block index in the second timeslot is N−1−m, and the time domain length of the channel structure is one subframe, and when a cyclic prefix is a normal cyclic prefix, the number of uplink SC-FDMA symbols corresponding to the data is 5, the number of uplink SC-FDMA symbols corresponding to the demodulation reference signals is 2 and they are located on the 2nd uplink SC-FDMA symbol and the 6th uplink SC-FDMA symbol of each timeslot; and when the cyclic prefix is an extended cyclic prefix, the number of uplink SC-FDMA symbols corresponding to the data is 5, the number of uplink SC-FDMA symbols corresponding to the demodulation reference signals is 1 and it is located on the 3rd uplink SC-FDMA symbol or the 4th uplink SC-FDMA symbol of each timeslot, and a time domain extended code is a 5-order DFT sequence as shown in Table 4.

Encoding Scheme 1

Original O bits of data are divided into Y groups, RM (24, O) encoding is performed on each group of data respectively, and as shown in Table 5, the length of the ith group is L×Q after the encoding, wherein, Y=2, L=12 and Q=2, and a QPSK modulation mode is used; or the original O bits of data are divided into Y groups, convolutional encoding is performed on each group of data respectively, and the length is L×Q after the encoding, wherein, Y=2, n=1, L=12 and Q=2, and the QPSK modulation mode is used;

before the encoding, a group division way of the first $$\left\lfloor \frac{O}{2} \right\rfloor$$

bits belonging to a group and the remainder bits belonging to a group can be used; or, a group division way of classifying bits in the even bit under a group and classifying bits in the odd bit under another group can be used.

A specific encoding way of the used RM (24, O) encoding is: a fundamental sequence length performing encoding on multiple feedback information, including specifically:

$$b_i = \sum_{n=0}^{M_j-1} (O_n \cdot M_{mod(i,N),h}) \bmod 2,$$

wherein, i=0, 1, 2, . . . , $B_j$–1, $b_0^j$, $b_1^j$ . . . , $b_{B_j-1}$ represents a bit sequence after the encoding, $B_j$ represents the length $B_j$=L×Q of the jth group after the encoding, N represents the fundamental sequence length, $M_{i,h}$ represents a value of serial number i in a fundamental sequence h, $O_0^j$, $O_1^j$, K, $O_{M_j-1}^j$ represents feedback information included in the jth group, $M_j$ represents the number of information bits contained in the jth group, fundamental sequences are as shown in Table 6, and the fundamental sequences also can be in the form where the line replacement has been performed on the fundamental sequences of Table 6.

Each group of encoded bit sequences which are output after going through the encoding is $b_0$, $b_1$ . . . , $b_{B-1}$, wherein, B represents the length after the encoding, and B=2×L×Q;

all groups of the bits can be concatenated in order, such as $b_0^0$, . . . , $b_{B-1}^0$, . . . , $b_0^j$, . . . , $b_{B-1}^j$, and also can be interleaved, such as $b_0^0$, . . . , $b_{B-1}^0$, . . . , $b_0^j$, . . . , $b_{B-1}^j$; or, they can be concatenated by block, 2 bits are in a block, and all groups are interleaved with a block as a unit, such as $b_0^0$, $b_1^0$, $b_0^1$, $b_1^1$, . . . , $b_{22}^0$, $b_{23}^0$, $b_{22}^1$, $b_{23}^1$; or, they can be concatenated by block, 12 bits are in a group, and all groups are interleaved with a block as a unit, such as $b_0^0$, . . . , $b_{11}^0$, $b_0^1$, . . . , $b_{11}^1$, $b_{12}^0$, . . . , $b_{23}^0$, $b_{12}^1$, . . . , $b_{23}^1$.

to a certain rule (the interleaving process is optional); the interleaving method is performing interleaving on bits to be interleaved according to a sequence {$x_0$, $x_1$ . . . , $x_{B-1}$}, $x_0$, $x_1$ . . . , $x_{B-1}$ is a positive integer sequence from 1 to B, or, the interleaving method is an interleaving method according to row-wise write and column-wise readers; for example, when the number of bits to be interleaved is 48, the sequence is {1, 3, 5, 7, 9, 11, 13, 15, 17, 19, 21, 23, 25, 27, 29, 31, 33, 35, 37, 39, 41, 43, 45, 47, 2, 4, 6, 8, 10, 12, 14, 16, 18, 20, 22, 24, 26, 28, 30, 32, 34, 36, 38, 40, 42, 44, 46, 48}, or {1, 2, 25, 26, 3, 4, 27, 28, 5, 6, 29, 30, 7, 8, 31, 32, 9, 10, 33, 34, 11, 12, 35, 36, 13, 14, 37, 38, 15, 16, 39, 40, 17, 18, 41, 42, 19, 20, 43, 44, 21, 22, 45, 46, 23, 24, 47, 48}, or {1, 2, 3, 4, 5, 6, 7, 8, 9, 10, 11, 12, 25, 26, 27, 28, 29, 30, 31, 32, 33, 34, 35, 36, 13, 14, 15, 16, 17, 18, 19, 20, 21, 22, 23, 24, 37, 38, 39, 40, 41, 42, 43, 44, 45, 46, 47, 48}, bits to be interleaved are rearranged according to the above order, and the interleaving is completed. Or, the interleaving method is a block interleaving method, that is, with regard to the encoding scheme 1, each group corresponds to 24 bits, and the bits data in one group are divided into 2 blocks in order, and each block contains 12 bits, and interleaved concatenating is performed on all blocks of data, and if it is assumed that the bit sequence is $b_0^0$, . . . , $b_{23}^0$, $b_0^1$ . . . , $b_{23}^1$ before the interleaving, the bit sequence is $b_0^0$, . . . , $b_{11}^0$, $b_0^1$, . . . , $b_{11}^1$, $b_{12}^0$, . . . , $b_{23}^0$, $b_{12}^1$, . . . , $b_{23}^1$ after the interleaving; or, the interleaving method is a block interleaving method, that is, with regard to the encoding

TABLE 6

Fundamental sequences

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 1 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 0 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |

Encoding Scheme 2

An encoding way of tail-biting convolutional code with a constraint length of 7 and a code rate of ⅓ as shown in FIG. 5 is used on feedback information $O_0$, $O_1$, . . . $O_{M-1}$; $b_0$, $b_1$, . . . , $b_{B-1}$ represents a bit sequence after the encoding, B represents the length after the encoding, and B=2×L×Q;

as shown in FIG. 8a, encoding, scrambling and/or interleaving and modulation are performed on the feedback information, and then DFT is performed on data which go through the above processing;

wherein the interleaving process is to convert the encoded sequence $b_0$, $b_1$ . . . , $b_{B-1}$) to obtain $b'_0$, $b'_1$, . . . , $b'_{B-1}$ according scheme 1, each group corresponds to 24 bits, and the bits data in one group are divided into 6 blocks in order, and each block contains 2 bits, and interleaved concatenating is performed on all blocks of the data, and if it is assumed that the bit sequence is $b_0^0$, . . . , $b_{23}^0$, $b_0^1$ . . . , $b_{23}^1$ before the interleaving, the bit sequence is $b_0^0$, $b_1^0$, $b_0^1$, $b_1^1$, . . . , $b_{22}^0$, $b_{23}^0$, $b_{22}^1$, $b_{23}^1$ after the interleaving;

wherein the scrambling process is that modulo-2 is performed after adding a scrambling sequence $c_0$, $c_1$, . . . , $c_{B-1}$ and the encoded and interleaved sequence $b'_0$, $b'_1$, . . . , $b'_{B-1}$ (or the encoded sequence $b_0$, $b_1$, . . . , $b_{B-1}$), and obtaining a scrambled sequence $q_0, q_1, \ldots, q_{B-1}$, namely $q_i=\mathrm{mod}((c_i+b'_i), 2)(i=0, 1, \ldots B-1)$, and the scrambling sequence is composed of pseudorandom sequences;

wherein the modulation mode is QPSK, and a modulated sequence is $$Q_0, Q_1, \ldots Q_{\frac{B}{Q_m}-1}(Q_m = 2);$$

wherein time domain extension means extending the encoded sequence to the occupied symbols by using an orthogonal sequence, and the orthogonal sequence can be a DFT sequence;

wherein the DFT means performing DFT operation on the modulated sequence on the symbol;

or, as shown in FIG. 8b, encoding, scrambling, modulation and/or interleaving are performed on the data, and then Discrete Fourier Transform (DFT) is performed on data which go through the above processing;

wherein the scrambling process is that modulo-2 is performed after adding a scrambling sequence $c_0, c_1, \ldots, c_{B-1}$ and the encoded sequence $b_0, b_1, \ldots, b_{B-1}$, and obtaining a scrambled sequence $q_0, q_1, \ldots, q_{B-1}$, namely $q_i=\mathrm{mod}((c_i+b'_i), 2)(i=0, 1, \ldots B-1)$, and the scrambling sequence is composed of pseudorandom sequences;

wherein the modulation mode is QPSK, ($Q_m=2$), and a modulated sequence is $$Q_0, Q_1, \ldots Q_{\frac{B}{Q_m}-1};$$

wherein the interleaving process is to convert the modulated sequence $$Q_0, Q_1, \ldots Q_{\frac{B}{Q_m}-1}$$

to obtain $$Q'_0, Q'_1, \ldots Q'_{\frac{B}{Q_m}-1}$$

according to a certain rule; the interleaving method (optional) is performing interleaving on bits to be interleaved according to a sequence $$\{x_0, x_1 \ldots, x_{\frac{B}{Q_m}-1}\},$$

is a positive integer sequence from 1 to $$\frac{B}{Q_m} - 1,$$

or, the interleaving method is a interleaving method according to row-wise write and column-wise readers; for example, when the number of modulation symbols to be interleaved is 24, the sequence is {1, 2, 3, 4, 5, 6, 13, 14, 15, 16, 17, 18, 7, 8, 9, 10, 11, 12, 19, 20, 21, 22, 23, 24}, or {1, 3, 5, 7, 9, 11, 13, 15, 17, 19, 21, 23, 2, 4, 6, 8, 10, 12, 14, 16, 18, 20, 22, 24}, bits to be interleaved are rearranged according to the above order, and the interleaving is completed. Or, the interleaving method is block interleaving, with regard to the encoding scheme 1, each group corresponds to 12 modulation symbols, and one group is divided into 2 blocks in order, and each block contains 6 modulation symbols, interleaved concatenating is performed on all blocks, and the modulation symbol sequence is $Q_0, Q_1, \ldots Q_{23}$ before the interleaving, and the modulation symbol sequence is $Q_0, \ldots, Q_5, Q_{12}, \ldots, Q_{15}, Q_6, \ldots, Q_{11}, Q_{16}, \ldots, Q_{23}$ after the interleaving;

wherein time domain extension means extending the encoded sequence to the occupied symbols by using an orthogonal sequence, and the orthogonal sequence can be a DFT sequence;

wherein the DFT means performing DFT operation on the modulated sequence on the symbol;

or, as shown in FIG. 8c, encoding, scrambling, modulation and concatenating are respectively performed on the feedback information, on which group division has been performed, in groups, and then Discrete Fourier Transform (DFT) is performed on data which go through the above processing;

wherein the scrambling process is that modulo-2 is performed after adding a scrambling sequence $c_0, c_1, \ldots, c_{B-1}$ and the encoded sequence $b_0, b_1, \ldots, b_{B-1}$, and obtaining a scrambled sequence $q_0, q_1, \ldots, q_{B-1}$, namely $q_i=\mathrm{mod}((c_i+b'_i), 2)(i=0, 1, \ldots B-1)$, and the scrambling sequence is composed of pseudorandom sequences;

wherein the modulation mode is the QPSK, ($Q_m=2$), and a modulated sequence is $$Q_0, Q_1, \ldots Q_{\frac{B}{Q_m}-1};$$

wherein, with regard to the encoding scheme 1, each group corresponds to 12 modulation symbols, and each group of modulation symbol sequences is $Q_0^0, Q_1^0, \ldots, Q_{11}^0, Q_0^1, Q_1^1, \ldots, Q_{11}^1$, two groups of modulated symbols are interleaved, and the modulation symbols are $Q_0, \ldots, Q_5, Q_{12}, \ldots, Q_{15}, Q_6, \ldots, Q_{11}, Q_{16}, \ldots, Q_{23}$ after the concatenating;

wherein time domain extension means extending the encoded sequence to the occupied symbols by using an orthogonal sequence, and the orthogonal sequence can be a DFT sequence;

wherein the DFT means performing DFT operation on the modulated sequence on the symbol;

the feedback information transmitted by the channel can be one or multiple kinds of ACK/NACK information, channel state information, rank indication information and scheduling request information; according to cells configured by a UE and corresponding transmission modes, the amount of the feedback information is determined; and the channel resources are configured to a target UE through upper layer signalings.

The channel in the example can be applied when the amount of ACK/NACK feedback information in TDD is greater than 11 in the carrier aggregation or when a UE performs feedback of channel state information of r downlink cells.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

INDUSTRIAL APPLICABILITY

In the present invention, the number of bits of feedback information of UE is increased, which enhances the uplink feedback capacity, guarantees the maximum throughput of the system, and decreases the feedback delay of downlink channel information.

What is claimed is:

1. A method for transmitting feedback information, the method comprising:
  a User Equipment (UE) performing time domain extension for feedback information within one subframe; and
  mapping data which go through the time domain extension and demodulation reference signals corresponding to the data which go through the time domain extension respectively to multiple uplink Single Carrier-Frequency Division Multiple Access (SC-FDMA) symbols within the subframe, and transmitting the data which go through the time domain extension and the demodulation reference signals corresponding to the data which go through the time domain extension in a same frequency domain position in a way of time division multiplexing;
  wherein each uplink SC-FDMA symbol occupies n successive physical resource blocks in a frequency domain, and n is a positive integer;
  wherein the step of performing time domain extension for feedback information comprises firstly dividing O bits of feedback information into Y groups, and then encoding each group of data respectively;
  wherein the step of dividing O bits of feedback information into Y groups comprises: starting from a first bit in a sequence composed of feedback information, performing division into Y groups in order, except the last group, $$\left\lfloor \frac{O}{Y} \right\rfloor$$

bits contained in each group, and the number of bits contained in the last group being equal to or greater than $$\left\lfloor \frac{O}{Y} \right\rfloor$$

bits; or performing modulo operation between a location in which each bit is located in the sequence composed of the feedback information and the Y, and classifying bits with identical modulo values under a group; or, when the feedback information is channel state information, classifying bits representing feedback information corresponding to each cell under a group correspondingly; or, starting from the first bit in the sequence composed of the feedback information, performing division into Y groups in order, wherein the number of bits contained in each group of O mod Y groups is $$\left\lfloor \frac{O}{Y} \right\rfloor + 1,$$

and the number of bits contained in each group of remaining Y−(O mod Y) groups is $$\left\lfloor \frac{O}{Y} \right\rfloor.$$

O is a positive integer, Y is a positive integer.

2. The method according to claim 1, wherein:
  the step of performing time domain extension for feedback information further comprises: scrambling and/or interleaving, and modulation for the feedback information, and then performing Discrete Fourier Transform (DFT) on data which go through the encoding, scrambling and/or interleaving and modulation, wherein a processing order of the scrambling, interleaving and modulation is arbitrary.

3. The method according to claim 2, wherein:
  the step of performing encoding for feedback information further comprises: an encoding way being RM (32, O) encoding or convolutional encoding; wherein, if a length of an ith group of data is $Z_i$ after the encoding, then $$\sum_{i=0}^{Y-1} Z_i = n \times L \times Q \times 2 \text{ or } \sum_{i=0}^{Y-1} Z_i = n \times L \times Q,$$

wherein, Q represents the number of bits corresponding to one modulation symbol, L is the number of subcarriers contained in one physical resource block, and n, Q and L are positive integers.

4. The method according to claim 1, wherein, the step of performing time domain extension for feedback information within one subframe comprises:
  the UE concatenating all groups of encoded feedback information in order, or interleaving all groups of encoded feedback information, or interleaving all groups of encoded feedback information by block; or after respectively performing scrambling and modulation operation on each group of encoded feedback information, the UE concatenating all groups of symbols obtained after modulation, wherein, a concatenating way is orderly concatenating or interleaving.

5. The method according to claim 2, wherein:
  an interleaving way is to perform interleaving on data to be interleaved according to a fixed sequence, or to perform interleaving on the data to be interleaved according to a row-wise write and column-wise read matrix way, or to perform interleaving according to a block interleaving method.

6. The method according to claim 2, wherein:
  the step of performing DFT on data which go through the encoding, scrambling and/or interleaving and modulation comprises: performing DFT processing on all data in a time domain, or performing DFT processing on data borne by each physical resource block in the time domain respectively.

7. The method according to claim 1, wherein:
  the demodulation reference signals is a sequence with a length of n×L; or is a sequence which is composed of n sequences with lengths of L, wherein L is the number of subcarriers contained in one physical resource block.

8. A user equipment, the user equipment comprising: a time domain extension module and a data transmission module; wherein the time domain extension module is configured to: perform time domain extension on feedback information within one subframe;

the data transmission module is configured to: map extended data obtained by the time domain extension module and demodulation reference signals corresponding to the extended data respectively to multiple uplink Single Carrier-Frequency Division Multiple Access (SC-FDMA) symbols within the subframe, and transmit the extended data and the demodulation reference signals corresponding to the extended data in a same frequency domain position in a way of time division multiplexing; wherein, each uplink SC-FDMA symbol occupies n successive physical resource blocks in a frequency domain, and n is a positive integer;

wherein the time domain extension module is configured to firstly divide O bits of feedback information into Y groups, and then encoding each group of data respectively;

wherein the time domain extension module is further configured to perform division into Y groups in order by starting from a first bit in a sequence composed of feedback information, except the last group, $$\left\lfloor \frac{O}{Y} \right\rfloor$$

bits contained in each group, wherein the number of bits contained in the last group is equal to or greater than $$\left\lfloor \frac{O}{Y} \right\rfloor$$

bits; or perform modulo operation between a location in which each bit is located in the sequence composed of the feedback information and the Y, and classify bits with identical modulo values under a group; or, when the feedback information is channel state information, classify bits representing feedback information corresponding to each cell under a group correspondingly; or perform division into Y groups in order by starting from the first bit in the sequence composed of the feedback information, wherein the number of bits contained in each group of O mod Y groups is $$\left\lfloor \frac{O}{Y} \right\rfloor + 1,$$

and the number of bits contained in each group of remaining Y−(O mod Y) groups is $$\left\lfloor \frac{O}{Y} \right\rfloor.$$

O is a positive integer, Y is a positive integer.

9. The user equipment according to claim 8, wherein:
the time domain extension module is further configured to perform time domain extension on the feedback information within one subframe in a following way: scrambling and/or interleaving, and modulation for the feedback information, and performing Discrete Fourier Transform (DFT) on data which go through the above processing, wherein, a processing order of the scrambling, interleaving and modulation is arbitrary.

10. The user equipment according to claim 9, wherein:
the time domain extension module is configured to, an encoding way is RM (32, O) encoding or convolutional encoding; wherein, if a length of an ith group of data is $Z_i$ after the encoding, then $$\sum_{i=0}^{Y-1} Z_i = n \times L \times Q \times 2 \text{ or } \sum_{i=0}^{Y-1} Z_i = n \times L \times Q,$$

wherein, Q represents the number of bits corresponding to one modulation symbol, L is the number of subcarriers contained in one physical resource block, and n, L and Q are positive integers.

11. The user equipment according to claim 8, wherein, the time domain extension module is configured to concatenate all groups of encoded feedback information in order, or interleave all groups of encoded feedback information, or interleave all groups of encoded feedback information by block; or after respectively performing scrambling and modulation operation on each group of encoded feedback information, concatenate all groups of symbols obtained after modulation, wherein, a concatenating way is orderly concatenating or interleaving.

12. The user equipment according to claim 9, wherein:
an interleaving way is to perform interleaving on data to be interleaved according to a fixed sequence, or to perform interleaving on the data to be interleaved according to a row-wise write and column-wise read matrix way, or to perform interleaving according to a block interleaving method.

13. The user equipment according to claim 8, wherein:
the feedback information comprises any one or any combination of ACKnowledgement or Non-ACKnowledgement (ACK/NACK) information, channel state information, rank indication information and scheduling request information.

14. The method according to claim 1, wherein:
when a total bandwidth is N and physical resource block indexes are numbered from 0, if a physical resource block index occupied by an uplink SC-FDMA symbol within a first timeslot in the subframe is m, a physical resource block index occupied by an uplink SC-FDMA symbol within a second timeslot in the subframe is N−1−m or m;

or when h uplink SC-FDMA symbols are contained in one timeslot, the step of mapping data which go through the time domain extension and demodulation reference signals corresponding to the data which go through the time domain extension to multiple uplink SC-FDMA symbols within the subframe comprises: mapping the data which go through the time domain extension respectively to f uplink SC-FDMA symbols within each timeslot in the subframe, and mapping the demodulation reference signals corresponding to the data which go through the time domain extension respectively to another g uplink SC-FDMA symbols within each timeslot in the subframe; or, mapping a part of the data which go through the time domain extension to f uplink SC-FDMA symbols within a first timeslot in the subframe, mapping another part of the data to f uplink SC-FDMA symbols within a second timeslot in the subframe, and mapping the demodulation reference signals correspondingly to all parts of mapped data correspondingly to another g uplink SC-FDMA symbols within corresponding timeslots in the subframe; wherein, h=f+g, and f is a time domain extended sequence length;

or the feedback information comprises any one or any combination of ACKnowledgement or Non-ACKnowledgement (ACK/NACK) information, channel state information, rank indication information and scheduling request information.

15. The method according to claim 5, wherein the block interleaving method comprises that each block contains 2 bit or 12 bits.

16. The method according to claim 15, wherein the block interleaving method further comprises:

when a number of bits to be interleaved is 48, which is divided into two groups, each group corresponds to 24 bits, and the bits data in one group are divided into 2 blocks in order, and each block contains 12 bits, and interleaved concatenating is performed on all blocks of data, and if it is assumed that the bit sequence is $b_0^0, \ldots, b_{23}^0, b_0^1 \ldots, b_{23}^1$ before the interleaving, the bit sequence is $b_0^0, \ldots, b_{11}^0, b_0^1, \ldots, b_{11}^1, b_{12}^0, \ldots, b_{23}^0, b_{12}^1, \ldots, b_{23}^1$ after the interleaving;

or, each group corresponds to 24 bits, and the bits data in one group are divided into 6 blocks in order, and each block contains 2 bits, and interleaved concatenating is performed on all blocks of the data, and if it is assumed that the bit sequence is $b_0^0, \ldots, b_{23}^0, b_0^1 \ldots, b_{23}^1$ before the interleaving, the bit sequence is $b_0^0, b_1^0, b_0^1, b_1^1, \ldots, b_{22}^0, b_{23}^0, b_{22}^1, b_{23}^1$ after the interleaving.

17. The method according to claim 12, wherein the block interleaving method comprises that each block contains 2 bit or 12 bits.

18. The method according to claim 17, wherein the block interleaving method further comprises:

when a number of bits to be interleaved is 48, which is divided into two groups, each group corresponds to 24 bits, and the bits data in one group are divided into 2 blocks in order, and each block contains 12 bits, and interleaved concatenating is performed on all blocks of data, and if it is assumed that the bit sequence is $b_0^0, \ldots, b_{23}^0, b_0^1 \ldots, b_{23}^1$ before the interleaving, the bit sequence is $b_0^0, \ldots, b_{11}^0, b_0^1, \ldots, b_{11}^1, b_{12}^0, \ldots, b_{23}^0, b_{12}^1, \ldots, b_{23}^1$ after the interleaving;

or, each group corresponds to 24 bits, and the bits data in one group are divided into 6 blocks in order, and each block contains 2 bits, and interleaved concatenating is performed on all blocks of the data, and if it is assumed that the bit sequence is $b_0^0, \ldots, b_{23}^0, b_0^1 \ldots, b_{23}^1$ before the interleaving, the bit sequence is $b_0^0, b_1^0, b_0^1, b_1^1, \ldots, b_{22}^0, b_{23}^0, b_{22}^1, b_{23}^1$ after the interleaving.

* * * * *